United States Patent
Shirai et al.

(10) Patent No.: US 11,949,934 B2
(45) Date of Patent: Apr. 2, 2024

(54) VIDEO DISTRIBUTION SYSTEM, VIDEO DISTRIBUTION METHOD, VIDEO DISTRIBUTION PROGRAM, INFORMATION PROCESSING TERMINAL, AND VIDEO VIEWING PROGRAM

(71) Applicant: GREE, INC., Tokyo (JP)

(72) Inventors: Akihiko Shirai, Tokyo (JP); Misaki Murakami, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 17/419,195

(22) PCT Filed: Dec. 25, 2019

(86) PCT No.: PCT/JP2019/050766
§ 371 (c)(1),
(2) Date: Jun. 28, 2021

(87) PCT Pub. No.: WO2020/138143
PCT Pub. Date: Jul. 2, 2020

(65) Prior Publication Data
US 2022/0070513 A1    Mar. 3, 2022

(30) Foreign Application Priority Data

Dec. 28, 2018    (JP) .................................. 2018-246394
Sep. 24, 2019    (JP) .................................. 2019-173325

(51) Int. Cl.
*H04N 21/258* (2011.01)
*G06T 13/40* (2011.01)
(Continued)

(52) U.S. Cl.
CPC ........... *H04N 21/258* (2013.01); *G06T 13/40* (2013.01); *H04N 21/235* (2013.01); *H04N 21/239* (2013.01)

(58) Field of Classification Search
CPC .. H04N 21/258; H04N 21/235; H04N 21/239; H04N 21/23412; H04N 21/4312;
(Continued)

(56) References Cited

U.S. PATENT DOCUMENTS

2002/0078441 A1*  6/2002  Drake .............. H04N 21/47202
                                                        348/E7.071
2011/0298702 A1* 12/2011  Sakata ...................... G06T 7/74
                                                        345/156
(Continued)

FOREIGN PATENT DOCUMENTS

JP    2012-120098 A    6/2012
JP    2015-184689 A   10/2015
(Continued)

OTHER PUBLICATIONS

Mar. 3, 2020 Search Report issued in International Patent Application No. PCT/JP2019/050766.
(Continued)

*Primary Examiner* — Adil Ocak
(74) *Attorney, Agent, or Firm* — Oliff PLC

(57) ABSTRACT

A video distribution system is provided with (i) a server that distributes a video including an animation of a character object generated based on motion of an actor and (ii) an information processing terminal in which an application for viewing the video is implemented and used by a viewing user who views the video. The server generates video data related to a video including the character object and a particular object that changes a display mode a plurality of times. The particular object is displayed in the video in a plurality of different display modes. The server transmits the video data to the information processing terminal, receives information about the activity of the viewing user from the information processing terminal, and changes the display mode of the particular object displayed in the video according to the activity of the viewing user.

16 Claims, 13 Drawing Sheets

(51) Int. Cl.
*H04N 21/235* (2011.01)
*H04N 21/239* (2011.01)

(58) Field of Classification Search
CPC ......... H04N 21/4788; H04N 21/41407; H04N 21/44012; H04N 21/8146; H04N 21/854; G06T 13/40; G06F 13/00
See application file for complete search history.

(56) References Cited

U.S. PATENT DOCUMENTS

| | | | |
|---|---|---|---|
| 2015/0334075 A1* | 11/2015 | Wang | G06F 3/0484 |
| | | | 715/752 |
| 2015/0379752 A1* | 12/2015 | Li | G06T 13/80 |
| | | | 715/752 |
| 2017/0046865 A1* | 2/2017 | Cantwell | H04N 13/204 |
| 2019/0102929 A1* | 4/2019 | Davis | G06F 21/6209 |
| 2019/0122638 A1* | 4/2019 | Anderson | G09G 5/003 |
| 2019/0349625 A1 | 11/2019 | Watanabe et al. | |

FOREIGN PATENT DOCUMENTS

| | | | |
|---|---|---|---|
| JP | 2018-75259 A | 5/2018 | |
| JP | 6420930 B1 | 11/2018 | |

OTHER PUBLICATIONS

Nov. 22, 2022 Office Action issued in Japanese Patent Application No. 2019-209385.

* cited by examiner

| CONTENT | NUMBER OF VIEWING USERS | NUMBER OF POSTED MESSAGES | VIEWING TIME | NUMBER OF DISTRIBUTIONS |
|---|---|---|---|---|
| C001 | 100 | 700 | 150 | 2 |
| ⋮ | ⋮ | ⋮ | ⋮ | ⋮ |

FIG. 6A

| USER ID | POSSESSED GIFT | POSTED DATE AND TIME | SELECTED STATUS |
|---|---|---|---|
| 0001 | OB001 | **** | -------- |
|  | OB002 | **** | UNSELECTED |
|  | OB003 | **** | -------- |

FIG. 6B

| CONTENT | USER ID | GIFT OBJECT | POSTED DATE AND TIME | TYPE | SELECTED STATUS |
|---|---|---|---|---|---|
| C001 | 0002 | OB004 | **** | NORMAL | -------- |
|  | 0003 | OB005 | **** | DECORATIVE | UNSELECTED |
|  | 0010 | OB006 | **** | EFFECT | -------- |

FIG. 6C

| CONTENT | USER ID | MESSAGE CONTENT | POSTED DATE AND TIME | ATTRIBUTE |
|---|---|---|---|---|
| C001 | 0011 | HELLO | **** | ------- |
|  | 0012 | I FOLLOWED YOU | **** | FIRST ATTRIBUTE |
|  | 0013 | THANKS FOR YOUR GOOD WORK | **** | FIRST ATTRIBUTE |

FIG. 6D

| DISTRIBUTOR ID | CONTENT | LEVEL | NUMBER OF VIEWING USERS | NUMBER OF DISTRIBUTIONS |
|---|---|---|---|---|
| A001 | C001 | Lv1 | 100 | 2 |
|  | ⋮ | ⋮ | ⋮ | ⋮ |

FIG. 6E

VIDEO DISTRIBUTION SYSTEM, VIDEO DISTRIBUTION METHOD, VIDEO DISTRIBUTION PROGRAM, INFORMATION PROCESSING TERMINAL, AND VIDEO VIEWING PROGRAM

TECHNICAL FIELD

This disclosure relates to a video distribution system, a video distribution method, a video distribution program, an information processing terminal, and a video viewing program.

BACKGROUND TECHNOLOGY

Conventionally, there is known a video distribution system that generates an animation of a character object based on movement (motion) of an actor and distributes a video including the generated animation (see, for example, Patent Document 1).

In such a video distribution system, it has been proposed to distribute a video to user terminals of a plurality of viewing users and display arbitrary objects on the video in response to operation of the user terminals by the viewing users. The viewing users can display on the video, for example, gift objects or the like to be gifted to the character object.

PRIOR ART TECHNOLOGY REFERENCE

Patent Document

[Patent Document 1] JP 2015-184689A

SUMMARY

Problems to be Resolved

One of the problems for distributors is to increase the number of users viewing the video, the number of views, or the viewing time. To increase the number of viewing users, it is effective, as an example, to provide a mechanism that allows viewing users to actively participate in the video content. However, the reality is that it is difficult to increase the opportunities for viewing users to actively participate in content with only the measures that actors can take.

An object of this disclosure is to provide a mechanism for viewing users to participate in content.

Means for Solving Problems

In an aspect of this disclosure, a video distribution system is provided that distributes a video including an animation of a character object generated based on a motion of an actor. The video distribution system is provided with (i) an information processor that distributes a video and (ii) an information processing terminal in which an application for viewing the video is implemented, and which is used by a viewing user who views the video. The information processor generates video data related to the video including (i) the character object and (ii) a particular object that changes a display mode a plurality of times. The particular object is configured to be displayed in the video in a plurality of different display modes. The information processor (i) transmits the video data to the information processing terminal, (ii) receives information about an activity of the viewing user from the information processing terminal, and (iii) changes the display mode of the particular object displayed in the video according to the activity of the viewing user.

In another aspect, a video distribution method is provided that distributes a video including an animation of a character object generated based on a motion of an actor, using (i) an information processor that distributes the video and (ii) an information processing terminal on which an application for viewing the video is implemented. The video distribution method includes the information processor generating video data related to a video including (i) the character object and (ii) a particular object that changes a display mode a plurality of times. The particular object is configured to be displayed in the video in a plurality of different display modes. The video distribution method further (i) transmits the video data to the information processing terminal, (ii) receives, from the information processing terminal, information about an activity of a viewing user who uses the information processing terminal and views the video, and (iii) changes the display mode of the particular object displayed in the video according to the activity of the viewing user.

In yet another aspect, a video distribution program of an information processor is provided that distributes a video including an animation of a character object generated based on a motion of an actor. The video distribution program causes the information processor to execute a step of generating video data related to a video including (i) the character object and (ii) a particular object that changes a display mode a plurality of times. The particular object is configured to be displayed in the video in a plurality of different display modes. The video distribution program further executes (i) a step of transmitting the video data to an information processing terminal used by a viewing user who views the video, (ii) a step of receiving information about an activity of the viewing user from the information processing terminal, and (iii) a step of changing the display mode of the particular object displayed in the video according to the activity of the viewing user.

In yet another aspect, an information processing terminal is provided that displays, on a display, a video including an animation of a character object generated based on a motion of an actor. The information processing terminal executes (i) a step of receiving, from the information processor, video data related to a video including (a) the character object and (b) a particular object that changes a display mode a plurality of times, and displaying the video data on the display, (ii) a step of transmitting, to the information processor, information about an activity of a viewing user with respect to the video, and (iii) a step of receiving, from the information processor, the video data related to the video that has changed the display mode of the particular object according to the activity of the viewing user and an activity of another viewing user, and displaying the video on the display.

In yet another aspect, a video viewing program of an information processing terminal is provided that displays, on a display, a video including an animation of a character object generated based on a motion of an actor. The video viewing program causes the information processing terminal to execute (i) a step of receiving, from the information processor, video data related to a video including (a) the character object and (b) a particular object that changes a display mode a plurality of times, and displaying the video data on the display, (ii) a step of transmitting, to the information processor, information about an activity of a viewing user with respect to the video, and (iii) a step of receiving, from the information processor, the video data related to the video that has changed the display mode of the particular object according to the activity of the viewing user and an activity of another viewing user, and displaying the video data on the display.

BRIEF DESCRIPTION OF DRAWINGS

FIG. 6A is schematic diagram showing content management data used in the video distribution system of FIG. 1.

FIG. 6B is a schematic diagram showing a possession list used in the video distribution system of FIG. 1.

FIG. 6C is a schematic diagram showing a gift list used in the video distribution system of FIG. 1.

FIG. 6D is schematic diagram showing posted messages used in the video distribution system of FIG. 1.

FIG. 6E is a schematic diagram showing distributor data used in the video distribution system of FIG. 1.

MODES FOR IMPLEMENTING EMBODIMENTS INVENTION

Hereinafter, a video distribution system according to an embodiment of this disclosure will be described with reference to the drawings.

Figure 1:
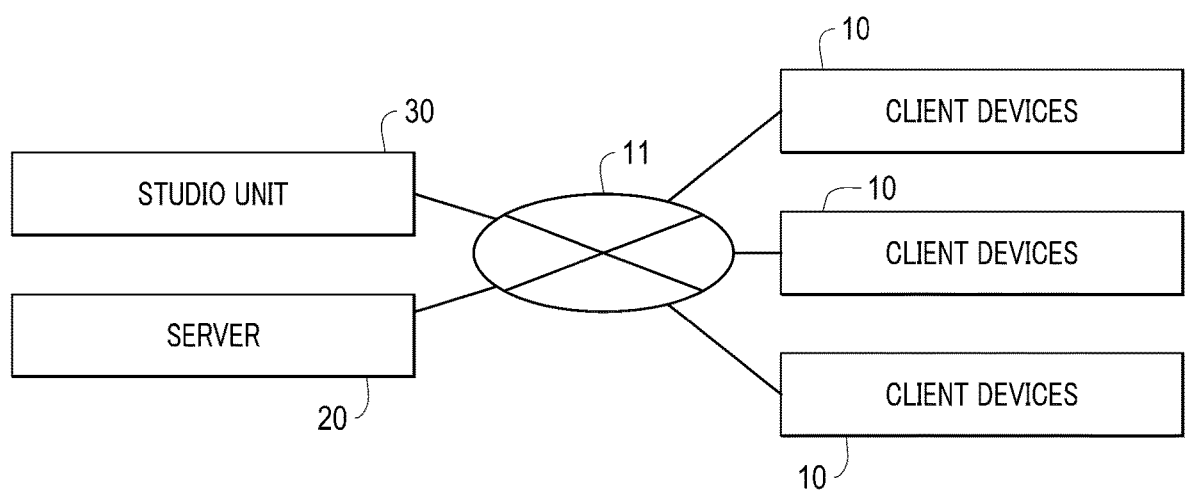
FIG. 1 is a schematic diagram of a video distribution system according to a first embodiment.

As shown in FIG. 1, a video distribution system 1 is provided with client devices 10, a server 20 as an example of an information processor, and a studio unit 30. The client devices 10, the server 20, and the studio unit 30 are connected so as to be able to communicate with each other via the network 11. The network 11 includes various networks such as a local area network and the Internet.

In the video distribution system 1, a distributor creates a video using the studio unit 30. The video contains an animation of a character object based on an actor's motion. The character object is an individual such as a virtual person. The created video is distributed to the client devices 10, used by viewing users, from the server 20. The distributor may be the actor, an operator of the studio unit 30, or a person other than these people.

Figure 2:
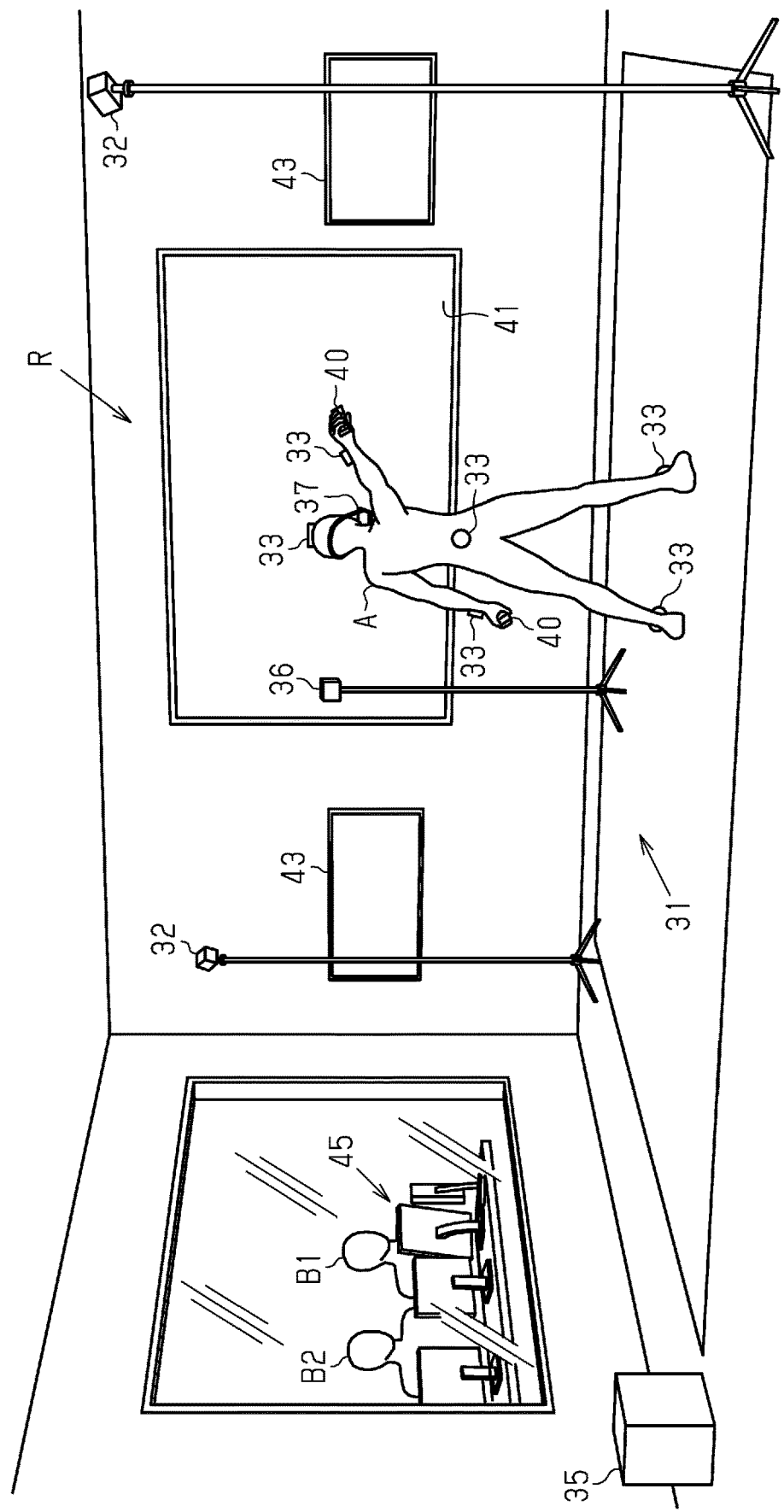
FIG. 2 is a schematic diagram showing equipment of a studio that creates a video distributed by the video distribution system of FIG. 1.

An overview of the studio unit 30 will be described with reference to FIG. 2. The studio unit 30 includes a tracking system 31, a controller 40, a main display 41, sub displays 43 (display devices), a microphone 44 (see FIG. 3), and a supporter computer 45.

The tracking system 31 acquires information about the motion of an actor A. The actor A is, for example, a performing human, animal, or moving object. The actor A may be, for example, a robot capable of independent movement. The number of actors in studio room R may be plural.

The tracking system 31 detects at least one of an orientation and a position of the actor A. Further, the tracking system 31 can detect a facial expression of the actor A, a position of a virtual camera set in a virtual space, and the like. For example, the tracking system 31 includes external sensors 32, worn sensors 33, and a positioning device 35. These detect at least one of the orientation and position of each worn sensor 33 worn by the actor A, by a method of tracking the worn sensors 33 using the external sensors.

The worn sensors 33 are worn on the actor A. A plurality of worn sensors 33 may be worn on the actor A. For example, six worn sensors 33 are worn on the left wrist, right wrist, left instep, right instep, waist, and top of the head of the actor A, respectively. The worn sensors 33 may be worn on the actor A via a wearing fixture. The worn sensors 33 can be worn on various parts of the actor A. For example, a worn sensor 33 may be worn on the finger of the hand to detect the motion of the finger. The number of worn sensors 33 worn on the actor A may be five or less, or seven or more. Further, the actor A may wear clothes, equipment, or the like provided with the worn sensors 33.

The worn sensors 33 output information for specifying their orientations and positions to the positioning device 35 in cooperation with the external sensors 32. An example of the external sensors 32 in an outside-in system is a multi-axis laser emitter. The external sensors 32 emit pulsed laser light for synchronization. Each worn sensor 33 includes a sensor that detects laser light, and detects its own position and orientation while synchronizing with the synchronization pulses. For the worn sensors 33 and the external sensors 32, for example, Vive Tracker (registered trademark) and Vive Base Station provided by HTC Corporation (registered trademark) can be used.

Further, in addition to or instead of the above, each worn sensor 33 may incorporate a sensor for autonomously specifying the orientation and/or position. For example, each worn sensor 33 may have, built in, at least one of a multi-axis acceleration sensor, a gyro, and a geomagnetic sensor. A capacitance type sensor, a strain gauge sensor, or the like may be used as the worn sensor 33. Further, both a worn sensor 33 that cooperates with the external sensors 32 and a worn sensor 33 that does not cooperate with the external sensors 32 may be used in combination. Further, a worn sensor 33 may be capable of detecting at least one of its orientation and its position by itself, that is, without cooperating with the external sensors.

The tracking system 31 includes a viewpoint position sensor 36 and a camera 37. The position of the viewpoint position sensor 36 can be changed by a user. The viewpoint position sensor 36 is configured in the same manner as the worn sensors 33. The viewpoint position sensor 36 outputs information for identifying its own orientation and position to the positioning device 35 wirelessly or via a communication cable. The viewpoint position sensor 36 is set as a viewpoint of a virtual camera in a virtual space. The viewpoint position sensor 36 may be supported by, for example, a stand, or may be supported by a gimbal or a stabilizer. The gimbal may have a shape that can be grasped by an actor or another person. By supporting the viewpoint position sensor 36 with a gimbal or a stabilizer, it is possible to suppress camera shake (video shaking).

The camera 37 is arranged so that the face of the actor A can be imaged. For example, the camera 37 is attached to the head, neck, or the like of the actor A, or is arranged in front of the actor A. The camera 37 continuously images the face of the actor A, acquires image data of the face of the actor A, and transmits the imaged data to the server 20. The camera 37 may be a 3D camera capable of detecting the depth of a person's face.

The microphone 44 is arranged at a position at which sound emitted by the actor A can be collected. For example, the microphone 44 is attached to the head, neck, or the like of the actor A, or is arranged in front of the actor A. The microphone 44 transmits, to the server 20, a signal corresponding to the sound.

The controller 40 is operated by the actor A. The controller 40 outputs, to the server 20, a control signal corresponding to an operation of the actor A. Further, the controller 40 may have, built in, a sensor for autonomously identifying at least one of the orientation and the position. For example, the controller 40 may include at least one of a multi-axis accelerometer, a gyro, and a geomagnetic sensor. Further, in addition to or in place of the above, the controller 40 may be able to detect at least one of the orientation and the position in cooperation with the external sensors 32.

The main display 41 is configured to display a video generated by the server 20. The main display 41 may be one display or a plurality of displays as shown in the figure. The video displayed on the main display 41 includes an animation of a character object.

The sub displays 43 are configured to display information received from the server 20 or the supporter computer 45. The number of sub-displays 43 may be one or a plurality. The information transmitted from the server 20 or the supporter computer 45 to the main display 41 may include, for example, text information, image information, and various other information. The main display 41 and the sub displays 43 are arranged at positions that can be seen by the actor A.

The supporter computer 45 is used by one or more operators (referred to as "supporters" in this specification) next to the studio room. For example, since the room in which the supporter computer 45 is installed and the studio room R are separated by a glass window, a supporter using the supporter computer 45 can visually perceive the actor A. In the illustrated embodiment, two supporters B1 and B2 are present. The supporter computer 45 outputs various information to the sub displays 43 according to the operations of the supporters. In this specification, when it is not necessary to distinguish between the supporter B1 and the supporter B2, the supporter B1 and the supporter B2 may be collectively referred to as "supporters." Structural elements and functions of the studio unit 30 shown in FIG. 2 are exemplary. The studio unit 30 applicable to this disclosure may include various structural elements that are not shown in the figure. For example, the studio unit 30 may include a projector. The projector can project, onto a screen, a video distributed to the client devices 10 or another client device.

Figure 3:
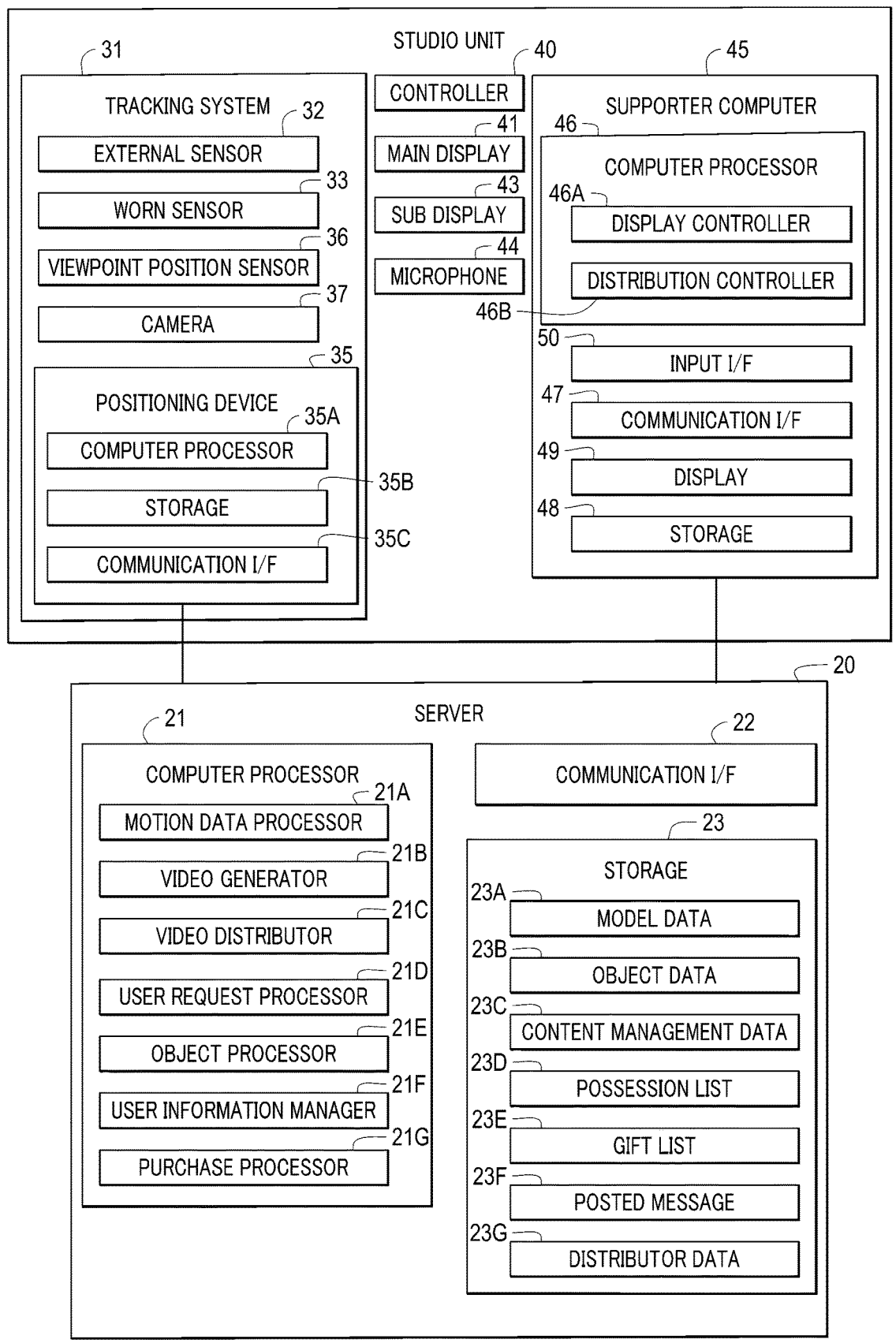
FIG. 3 is a block diagram showing part of the video distribution system of FIG. 1.

The server 20 will be described with reference to FIG. 3. The server 20 is configured to distribute, to a viewing user, a video including an animation of a character object based on an actor's motion. The character object included in this video may be motion-controlled in the virtual space. The server 20 includes a computer processor 21, a communication interface (I/F) 22, and a storage 23 (storage medium).

The computer processor 21 is a calculator that (i) loads an operating system and various programs that realize various functions from the storage 23 or other storage into a memory and (ii) executes commands included in the loaded programs. The computer processor 21 is, for example, a CPU, an MPU, a DSP, a GPU, or various other arithmetic devices, or a combination thereof. The computer processor 21 may realize at least part of the processing executed by itself by a circuit such as an ASIC, a PLD, an FPGA, or an MCU. Although the computer processor 21 is shown as a single structural element in FIG. 3, the computer processor 21 may be an assembly of a plurality of physically separated computer processors. In this specification, the programs described as being executed by the computer processor 21 or the commands contained in the programs may be executed by a single computer processor or may be distributed and executed by a plurality of computer processors. Further, the programs executed by the computer processor 21 or the commands included in the programs may be executed by one or more virtual computer processors.

The computer processor 21 executes computer-readable commands included in the distribution program stored in the storage 23 or other storage, whereby it functions as a motion data processor 21A, a video generator 21B, a video distributor 21C, a user request processor 21D, an object processor 21E, a user information manager 21F, and a purchase processor 21G.

At least part of the functions realized by the computer processor 21 may be realized by a computer processor other than the computer processor 21 of the video distribution system 1. Specifically, at least part of the functions realized by the computer processor 21 may be realized by, for example, a computer processor of a computer included in the studio unit 30 as an information processor. For example, the computer processor 46 of the supporter computer 45 may function as one or more of the motion data processor 21A, the video generator 21B, the video distributor 21C, the user request processor 21D, the object processor 21E, the user information manager 21F, and the purchase processor 21G.

Instead of this, at least part of the functions realized by the computer processor 21 may be realized by a computer processor included in an information processing terminal as an information processor, for example, an information processing terminal used by a distributor who distributes a video. In this case, instead of the tracking system 31, the motion of a body including the face of the distributor may be tracked by a sensor such as a camera included in the information processing terminal.

The motion data processor 21A generates body motion data, based on the tracking information detected by each of the worn sensors 33 worn on the actor. Body motion data is a time-series digital expression of at least one of the position and the orientation of each part of the actor's body. As time elapses, body motion data is generated as needed. For example, body motion data may be generated at predetermined sampling intervals.

Further, the motion data processor 21A generates face motion data which is a time-series digital expression of the face motion of the actor, based on shooting data of the camera 37 of the studio unit 30. As time elapses, face motion data is generated as needed. For example, face motion data may be generated at predetermined sampling intervals.

The video generator 21B applies the body motion data and the face motion data generated by the motion data processor 21A to predetermined model data included in model data 23A stored in the storage 23. Thereby, the video generator 21B generates an animation of a character object in which the character object moves in the virtual space and changes its facial expression.

Further, the video generator 21B constructs a virtual space using object data 23B stored in the storage 23, and generates a video including (i) an image of the virtual space and (ii) an animation of the character object corresponding to the actor A. The video generator 21B can use a position of the viewpoint position sensor 36 as a position of a virtual camera which is the viewpoint of the video. A relative position of the actor A with respect to the position of this virtual camera is defined as a position of the character object in the virtual space. Therefore, the actor A changes the position or orientation of the viewpoint position sensor 36 to an arbitrary position or orientation, whereby it is possible to generate a variety of videos such as a video viewed from the left side of a character object, a video viewed from the right side of the character object, and a video of a bird's-eye view of the character object. Additionally, the video generator 21B may change setting information (focus, angle of view, or the like) of the virtual camera, based on the position of the virtual camera.

The video distributor 21C transmits a list of videos for distribution to the client devices 10 and distributes the video generated by the video generator 21B. The video distributor 21C may distribute the video that is being shot in the studio room R in real time, or may distribute a previously shot video (recorded video) according to a distribution schedule or the like. The video distributor 21C may be configured to be able to distribute a plurality of videos in the same time slot. For example, the video distributor 21C can distribute at the same start time (for example, "20:00") or in overlapping time slots (i) a video of "Character X" played by "Actor A1" and (ii) a video of "Character Y" played by "Actor A2." The video distributor 21C transmits a list of distributable videos to the client devices 10 in response to list display requests from the client devices 10. When the video distributor 21C receives a video distribution request from a client device 10, the video distributor 21C transmits the video selected by a viewing user to the client device 10, based on the video distribution request.

The user request processor 21D receives object display requests and message display requests from the viewing users' client devices 10, and performs processing according to the display requests. A viewing user can transmit an object display request to the server 20 by operating his or her own client device 10. The object includes a gift object that the viewer provides to the content. A gift object is a digital gift from the viewing user to an actor or the like. Compensation may or may not be required for the viewing user to obtain the gift object or to request the display of the gift object. The viewing user may pay the compensation after the gift object is displayed in response to the display request. Part of the compensation paid by the viewing user for the gift object is associated with the distributor, and the remaining portion of the compensation is associated with the operator providing the video distribution platform. The gift object may be continuously displayed in the virtual space. The gift object may be temporarily displayed in the virtual space, or may temporarily add an effect to the virtual space. The display request for the gift object may include a user ID of the viewing user and identification information (object ID) of the object requested to be displayed.

Meanwhile, when the user request processor 21D determines that a decision of the actor or the supporter about the display of the requested gift object is needed, the user request processor 21D displays the requested gift object on the sub displays 43. When the actor or supporter instructs the display of the requested gift object, the user request processor 21D displays the requested object via the video generator 21B.

Further, on a video, the user request processor 21D performs a process for displaying a message received from the client devices 10. In addition to the content of the message, the message includes identification information (user ID or terminal ID) of the viewing user and the posting date and time.

When the user request processor 21D receives a message, it determines whether the message can be displayed. When the user request processor 21D determines that the received message can be displayed, it causes the message to be displayed in a predetermined area of the video via the video generator 21B. Further, the user request processor 21D displays, on the sub displays 43, the message and attribute information of the message.

Further, when a change condition has been satisfied, the object processor 21E changes a display mode of a particular object (growth object) other than the character object. The display mode of the particular object can be changed a plurality of times. That is, the particular object can be displayed in the video in a plurality of different display modes. The particular object may be an object that changes its form (display mode), such as an object that imitates an organism such as a plant or an animal whose state changes throughout its life cycle. Alternatively, the particular object may be an object that imitates something other than a living thing. A particular object that imitates a plant changes its morphology into a state of, for example, "seed", "bud", "flower", "fruiting", and "withering" each time the change condition has been satisfied.

The particular object may be given by the operator of the studio at a predetermined timing. Alternatively, the particular object may be given as a gift from a viewing user to the character. Alternatively, the particular object may be given to the distributor by the actor participating in an event executed in the video. When a viewing user gives the distributor a particular object as a gift to the character, the viewing user can be involved in the content of the video. Therefore, the viewing user can be motivated to purchase a particular object.

In addition, the object processor 21E analyzes the content of each message transmitted from the viewing user. The storage 23 stores a dictionary in which a plurality of words and phrases are registered. The object processor 21E extracts words and phrases included in the message and compares the words and phrases with the dictionary. Attributes are added to the words and phrases stored in the dictionary. For example, positive words such as "like" and "cute" are given an attribute such as "positive" (first attribute). In addition, negative words such as "dislike" and "pain" are given an attribute such as "negative" (second attribute). The object processor 21E searches the dictionary for words and phrases that match the extracted words and phrases, and identifies the attributes of the extracted words and phrases to determine the attribute to which each of the messages transmitted within the predetermined period belongs. A method for determining the attribute of the message may be performed by another method, for example, by determining the attribute based on a predetermined symbol included in the message.

When the object processor 21E determines the attribute of the message, it updates a counter that has been set for each attribute and calculates the number of messages of each attribute. Other than the number of messages, the number of words and phrases of the first attribute and the number of words and phrases of the second attribute included in the message may be counted. Alternatively, each of a plurality of words and phrases belonging to the same attribute may be weighted. For example, "1 point" may be counted for "cute" and "2 points" may be counted for "like," and the counted points may be accumulated. Also, the message does not have to belong to any of the attributes.

By the operation of the viewing user, the purchase processor 21G receives, from a client device 10, a display request for purchasable media such as gift objects related to the video. After receiving the display request for the purchasable media, the purchase processor 21G transmits information of the purchasable media to the client device 10. The information of the purchasable media may include the types of purchasable media, images of the purchasable media, price(s), and various information necessary for the purchase. The viewing user confirms the information of the purchasable media displayed on the client device 10 and selects an arbitrary purchasable medium. Once the viewing user selects the purchasable medium, the client device 10 transmits a purchase request for the purchasable medium to the server 20. The purchase processor 21G performs payment processing, based on the purchase request. When this payment process is completed, the server 20 stores the purchased medium as being possessed by the viewing user. Other than a gift object, the purchasable medium may be an object other than a gift object related to viewing the video, the right to view the video with different image quality, or the right to view a two-dimensional video or a three-dimensional video. Further, the purchasable medium may be the video itself. Sales proceeds of gift objects and other media that can be purchased are distributed to the distributor. At this time, part of the sales proceeds may be distributed to the operator of the studio unit 30.

The communication I/F 22 is implemented as hardware, firmware, communication software such as a TCP/IP driver, or a combination thereof. The server 20 can send and receive data to and from other devices via the communication I/F 22.

The storage 23 is a storage device accessed by the computer processor 21. The storage 23 is, for example, a magnetic disk, an optical disk, a semiconductor memory, or various other storage devices capable of storing data. Various programs can be stored in the storage 23. At least part of the programs and various data that can be stored in the storage 23 may be stored in the storage physically separated from the server 20.

The storage 23 stores the model data 23A, the object data 23B, content management data 23C, a possession list 23D, a gift list 23E, and a posted message 23F. Further, the storage 23 may store a video that is being distributed by the video distribution system 1, or a video already distributed.

Next, the position identifier 35 and the supporter computer 45 of the studio unit 30 will be further described. The position identifier 35 includes a computer processor 35A, a storage 35B (storage medium), and a communication interface (I/F) 35C. Similarly to the computer processor 21 of the server 20, the computer processor 35A is constituted by various calculators such as a CPU. Similarly to the storage 23 of the server 20, the storage 35B is constituted by various storage devices such as a magnetic disk. Similarly to the communication I/F 22 of the server 20, the communication interface (I/F) 35C is constituted by various drivers, software, or a combination thereof for communicating with other devices. The computer processor 35A executes a position detection program stored in the storage 35B or other storage, thereby acquiring tracking information from the external sensors 32 or the worn sensors 33 and identifying the respective positions of the worn sensors 33. Further, the computer processor 35A executes a position detection program stored in the storage 35B or another storage, thereby acquiring tracking information from the external sensors 32 or the viewpoint position sensor 36 and identifying the position of the viewpoint position sensor 36. Further, the position identifier 35 transmits the identified position to the server 20.

The supporter computer 45 includes a computer processor 46, a communication I/F 47, a storage 48 (storage medium), a display 49, and an input interface 50.

Similarly to the computer processor 21 of the server 20, the computer processor 46 is constituted by various calculators such as a CPU. Similarly to the communication I/F 22, the communication I/F 47 is constituted by various drivers, software, or a combination thereof for communicating with other devices. Similarly to the storage 23, the storage 48 is constituted by various storage devices capable of storing data such as a magnetic disk. Various programs are stored in the storage 48. The display 49 is an arbitrary display device capable of displaying an image, such as a liquid crystal display, an organic EL display, or an inorganic EL display. The input interface 50 includes any pointing device, such as a mouse or a keyboard, that accepts input from the supporter(s).

The computer processor 46 functions as a display controller 46A and a progress manager 46B by executing computer-readable commands included in a program stored in the storage 48 or the like. At least part of the functions realized by the computer processor 46 may be realized by a computer processor other than the computer processor 46 of the video distribution system 1. Further, at least part of the functions realized by the computer processor 46 in this specification may be realized by, for example, the computer processor 21 of the server 20.

The display controller 46A is configured so as to, in response to various operation inputs via the input interface 50 by the supporter(s) (i) display, on the main display 41 or the sub-displays 43, a view that is visible to the actor, but not visible to the viewing user(s) and (ii) add various information to the video distributed to the viewing user(s).

Figure 4:
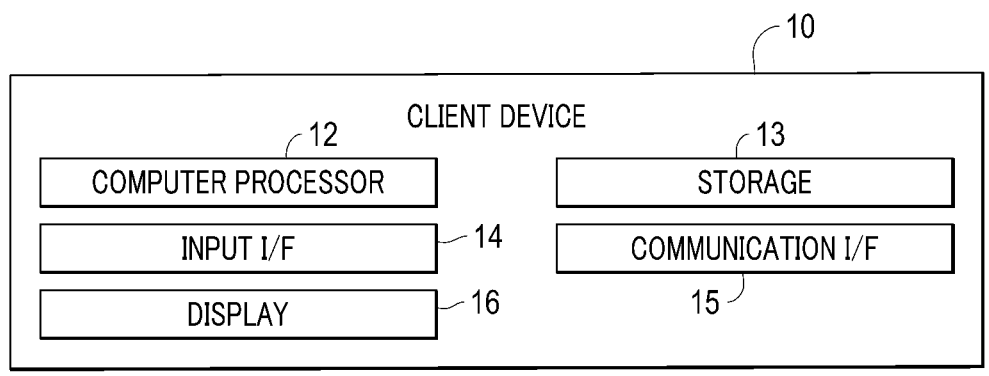
FIG. 4 is a block diagram showing a client device of FIG. 1.

Next, the client devices will be described with reference to FIG. 4.

A client device 10 is an information processor such as a smartphone. Other than a smartphone, the client device 10 may be a mobile phone, a tablet terminal, a personal computer, an electronic book reader, a wearable computer including a head-mounted display, a game console, or various other information processors capable of playing a video.

The client device 10 includes a computer processor 12, a storage 13 (storage medium), an input interface (I/F) 14 (input portion), a communication interface (I/F) 15, and a display 16. Similarly to the computer processor 21 of the server 20, the computer processor 12 is constituted by various calculators such as a CPU. Similarly to the storage 23 of the server 20, the storage 13 is constituted by various storage devices such as a magnetic disk. The storage 13 stores an application program for viewing a video distributed from the server 20. The input I/F 14 is an arbitrary input interface that accepts input from a viewing user such as a touch panel. Similarly to the communication I/F 22, the communication I/F 15 is constituted by various drivers, software, or a combination thereof for communicating with other devices. The display 16 is an arbitrary display device capable of displaying an image, such as an organic EL display or a liquid crystal display integrated with a touch panel.

The client device 10 activates a viewing application program (also referred to as a "native program") implemented in the client device 10 by accepting an operation of the viewing user via the input I/F 14. The viewing application has at least a function of viewing a video, and may have other functions. The computer processor 12 executes a computer-readable command included in the viewing application program to acquire a list of videos for distribution from the server 20. The client device 10 displays the acquired list on the display. The viewing user selects one of the videos displayed on the list. When the client device 10 receives a selection operation of the viewing user, it transmits a video distribution request requesting the distribution of the selected video to the server 20. Alternatively, the client device 10 may be configured to activate a web browser stored in the storage 13, access the server 20 via the web browser, and display on the display 16 a web page written in a markup language such as HTML or XML. The web page displays a list of videos. Alternatively, the client device 10 may display a list of videos by using both a viewing program and a web browser (in-app browser) stored in its own storage 13.

When the client device 10 receives video data from the server 20, it displays a video on the display 16 based on the received data. The viewing user can input a message regarding the distributed video via the input I/F 14 of the client device 10 and post this message to the server 20. The message posted by each viewing user may be superimposed on the video and displayed. As a result, the actor and the viewing user can interact with each other, and viewing users can interact with each other.

Next, various data stored in the storage 23 of the server 20 will be described. The model data 23A is model data for generating a character animation. The model data 23A may be three-dimensional model data for generating a three-dimensional animation, or may be two-dimensional model data for generating a two-dimensional animation. The model data 23A includes, for example, rig data indicating the skeleton of the character (sometimes referred to as "skeleton data") and surface data indicating the shape and texture of the surface of the character. The model data 23A can include a plurality of model data different from each other. Each model data may have different rig data or may have the same rig data. Each model data may have different surface data from each other, or may have the same surface data. In the illustrated embodiment, the model data 23A includes at least two different types of model data in order to generate a character object corresponding to an actor. The video data distributed to the client device 10 may be two-dimensional video data or three-dimensional video data. For example, the server 20 may generate three-dimensional video data based on the movement of the actor, convert the generated three-dimensional video data into two-dimensional video data, and distribute the converted two-dimensional video data to the client device 10.

The object data 23B includes asset data for constructing a virtual space constituting a video. The object data 23B includes data for drawing the background of the virtual space constituting the video, data for drawing various objects displayed in the video, and data for drawing various other objects displayed in the video. The object data 23B may include object position information indicating a position of an object in the virtual space. The object data 23B may include data (components) for determining physical behavior of the object. This data may include data for setting whether an object collides with another object, and data such as a friction coefficient and a coefficient of restitution. For example, if an object is set to collide with another object, and if the positional relationship between the object and the other object satisfies a predetermined positional relationship, it is determined that those objects have collided. The objects repel each other, or one of the objects bounces off. On the other hand, when the object is set not to collide with another object, the object does not collide with the other object even if the positional relationship between the object and the other object satisfies a predetermined positional relationship.

Other than the above, the object data 23B may include a gift object displayed in the video based on a display request from the viewing user of a client device 10. The gift object may include an effect object, a decorative object, and a normal object. An upper limit on the number of objects that can be purchased, or on the purchase price of the objects, may be set.

The effect object is an object that affects an overall impression of a viewing view of the distributed video, and is, for example, an object that imitates confetti, an object that imitates fireworks, or the like. An object that imitates confetti may be displayed in the entire viewing view, which can change the impression of the entire viewing view before and after the display. For example, an effect object may be represented by a particle system that represents a phenomenon constituted by moving particles. In the particle system, the display time may be set for each particle. The effect object may be a static object or a dynamic object. The effect object may appear to overlap with a character object. However, unlike a decorative object, it is not displayed in association with a particular part of the character object.

The decorative object is an object that is displayed in the display view in association with a particular part of the character object. For example, the decorative object may appear in the display view so that it touches a particular part of the associated character object. The decorative object may appear in the display view to cover some or all of a particular part of the associated character object.

The decorative object is, for example, an accessory that can be attached to a character object (such as a hairband, necklace, or earring), clothing (such as a T-shirt), a costume, or an object that can be attached to another character object. The object data 23B corresponding to the decorative object may include worn-position information indicating which part of the character object the decorative object is associated with. The worn-position information of a certain decorative object can indicate at which part of the character object the decorative object is worn. For example, when the decorative object is "cat ears," the worn-position information of the decorative object may indicate that the decorative object is worn on the "head" of the character object. When the decorative object is a "ring," the worn-position information of the decorative object may indicate that the decorative object is attached to the "finger" of the character object.

The decorative object is attached to the character object by being selected by the actor or supporter after being added to the list stored by the server 20 in the storage 23 or other storage. When the decorative gift object sent by the viewing user is attached to the character object, the viewing user feels close to the character object. On the other hand, even if the viewing user requests the display of the decorative object, the decorative object is not attached to the character object unless the actor or the supporter selects the corresponding decorative object. When the actor selects the decorative object, the actor selects the decorative object by checking the list displayed on the sub display 43 and using a pointing device such as the controller 40 or instructing the supporter. The supporter checks the list displayed on the supporter computer 45 and selects the decorative object using the input interface 50.

A normal object is a gift object, other than the decorative object, which is arranged as an object in the virtual space, and is, for example, an object imitating a stuffed animal or a bouquet. The normal object may appear to overlap with the character object, but unlike the decorative object, it is not displayed in association with a particular part of the character object. For example, an actor may be able to change the position of the normal object, but may not be able to change the position of the effect object(s). Further, the display time of the normal object may be different from the display time of the effect object(s).

A display time may be set for each gift object according to its type. For example, the display time of a decorative object may be set longer than the display time of an effect object or the display time of a normal object. For example, the display time of a decorative object may be set to 60 seconds, the display time of an effect object may be set to 5 seconds, and the display time of the normal object may be set to 10 seconds.

Figure 5:
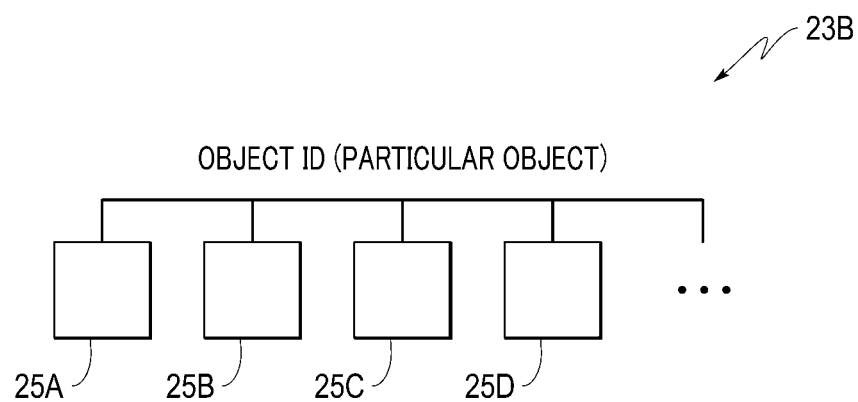
FIG. 5 is a schematic diagram showing object data used in the video distribution system of FIG. 1.

Further, as shown in FIG. 5, the object data 23B includes drawing data of a particular object. The particular object may be different from the background. For example, one piece of identification information (object ID) is associated with a plurality of drawing data 25A, 25B, 25C, 25D, and so on for drawing the corresponding particular object. Information indicating the stage of change (for example, "1" to "5") is associated with each of the drawing data. The drawing data 25A of "1" is used in the initial stage (initial mode) of the particular object, and when the change condition has been satisfied, the drawing data 25B of "2" is used in the next stage of the particular object. In an example of a change pattern of the display mode of a particular object, the particular object is displayed in a plurality of display modes in a particular order based on a series of drawing data in which information indicating the stage of change is respectively associated. Further, in another example of the change pattern of the display mode of a particular object, one change stage is associated with a plurality of drawing data (that is, the drawing pattern has a branch), and at the stage corresponding to the branch point, either of drawing data is used. For example, the information indicating the change stage of the drawing data includes "1," "2A," "2B," and so on, and at the change stage of "2," one of the drawing data of "2A" and the drawing data of "2B" is selected. In the subsequent stage, the pattern of each display mode may be continued (for example, "2A" is followed by "3A" and "2B" is followed by "3B"), or [the program] may return to the same display mode (for example, both "2A" and "2B" follow "3." The particular object may be drawn on a transparent or opaque backdrop object, or may be drawn between the background and the character object, and the drawing position or layer thereof is not particularly limited.

As shown in FIG. 6A, the content management data 23C stores at least one of the viewing status and the distribution status of the content for each of the contents of one or a plurality of character objects. The content may be distributed a plurality of times or may be distributed just once. For example, "distributor A" distributes the "content P," in which the "character P" is the main character, a plurality of times.

Further, another "distributor B" distributes the "content Q," in which the "character Q" is the main character, a plurality of times. Each content does not necessarily include a character animation different from the other content. For example, a plurality of different contents may be configured for the same character object.

The content management data 23C includes at least one of the number of viewing users, the number of message posts, the viewing time, and the number of distributions. The number of viewing users refers to (i) the number of viewing users obtained by accumulating the number of viewing users from the first distribution time to the latest distribution time, (ii) the number of viewing users of the latest distribution time, (iii) the number of viewing users of the distribution time with the most viewing users from the first distribution time to the latest distribution time, (iv) the number of viewing users of the distribution time with the fewest viewing users from the first distribution time to the latest distribution time, (v) the average number of viewing users from the first distribution time to the latest distribution time, or the like. The number of message posts refers to (i) the number of message posts obtained by accumulating the number of messages posted from the first distribution time to the latest distribution time, (ii) the number of messages posted in the latest distribution time, (iii) the number of messages posted in the distribution time with the most message posts, (iv) the number of message posts in the distribution time with the fewest message posts, (v) the average number of message posts from the first distribution time to the latest distribution time, or the like. The viewing time refers to a viewing time obtained by accumulating the viewing time of each viewing user from the first distribution time to the latest distribution time, the viewing time of the viewing user at the latest distribution time, or the like.

As shown in FIG. 6B, the possession list 23D is a list of objects (possessed objects) possessed by the viewing user. The possession list 23D may include identification information (object ID) of the possessed objects in association with the user ID. The possessed objects may be objects different for each content, may be an object common between different contents, or may include both of these objects. For the objects different for each content, the possession list 23D of the viewing user stores the identification information of the object for each content. The possession list 23D is continuously stored over a plurality of video distributions. The possession list 23D may be newly generated or reset each time the content for one time has been distributed.

As shown in FIG. 6C, the gift list 23E is a list of gift objects associated with the content. It is preferable that the gift list 23E is generated or reset every time the video is distributed. When the viewing user sends a gift object display request for the video, information about the gift object is added to the gift list 23E. The gift list 23E may include the identification information of the content, the identification information of the viewing user who sent the gift object (user ID), the identification information of the gift object (object ID), and the type of the gift object (decorative object, effect object, normal object), posted date and time, and the selection status of the gift object. The selection state of the gift object indicates whether the decorative object is selected by an actor or a supporter when the gift object is a decorative object. In the selection state, data indicating "selected" is stored when the decorative object is selected, and data indicating "unselected" is stored when the decorative object is not selected. If the gift object is not a decorative object, data indicating "unselected" is stored, or data other than "unselected" and "selected" is stored.

As shown in FIG. 6D, a posted message 23F may include information about messages posted by the viewing user to the video. The posted message 23F may include the identification information (user ID) of the viewing user, the content of the message, and the posted date and time when the message was posted for each content. The posted message 23F may be newly generated or reset each time the content for one time has been distributed. Further, the posted message 23F may include which attribute the message belongs to, such as a "first attribute." If the message does not belong to any of the attributes, the attribute data will not be stored.

As shown in FIG. 6E, distributor data 23G includes information about the distributor. The distributor data 23G may include distributor identification information (distributor ID), content identification information, and a distributor level. Further, the distributor data 23G may include the number of viewing users of the content and the number of distributions of the content. The level of the distributor is determined by the number of users viewing the content, the number of times the content is distributed, the number of registered favorites of the content, or the like. For example, as the number of viewing users increases, the level of the distributor may increase. Alternatively, as the number of distributions increases, the level of the distributor may increase.

Next, a screen displayed on the client device 10 will be described.

Figure 7:
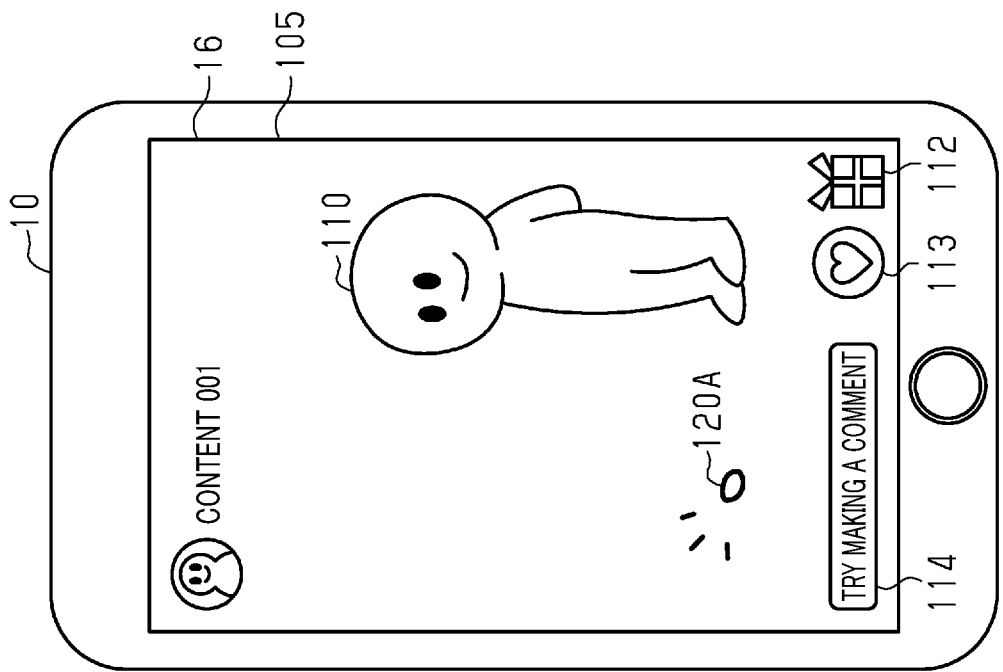
FIG. 7 is a diagram showing an example of a screen which is a viewing screen of the video distributed to the client device of FIG. 4 and in which a particular object is arranged in an initial state.

As shown in FIG. 7, a video viewing screen 105 is displayed on a display 16 of the client device 10, based on the video data transmitted from the server 20. On the video viewing screen 105, (i) a virtual space with the viewpoint position sensor 36 as a camera viewpoint and (ii) a character object 110 reflecting the movement of the actor are displayed. Further, on the video viewing screens 105, gift selectors 112 and 113 and a post selector 114 are displayed. The gift selector 112 is an operation portion for displaying on a video a gift object possessed by the viewing user. When the gift selector 112 is selected, a list of gift objects possessed by the viewing user is displayed based on the possession list 23D. When the viewing user selects a gift object from the list, the client device 10 sends a display request for the gift object. The gift selector 113 is an operation portion for requesting a display of a predetermined object such as a "heart" object. The gift selector 113 may request the display of gift objects that are not included in the possession list 23D. The post selector 114 is an operation portion for displaying a message input by the viewing user on the video during the period in which the message can be posted. When the post selector 114 is selected, a message input field is displayed, and the user inputs a message in the message input field.

When the server 20 receives a message from the client device 10 within a postable period, it transmits, to all the client devices 10 connected to the server 20, the video data related to the video including the message. The client devices 10 that have received video data display messages 130 on the video viewing screen 105. The messages 130 include the identification information of the viewing user who posted the messages and the message contents.

The messages 130 are arranged in a predetermined area of the video viewing screen 105 in the order of the posted date and time. When the server 20 receives a new message, the message 130 displayed at the top is moved down, and the new message is displayed at the top. A message that reaches the bottom of the message display area will move further down and disappear when a new message is added to the top. Alternatively, the message display area may be capable of displaying only one message.

Further, when the server 20 receives a gift object display request from a client device 10 within a period in which the gift object display request can be accepted, it displays the gift object at a timing according to the type of the gift object. The gift object is a normal object or an effect object. Additionally, the gift object is a decorative object (for example, "cat ears") displayed in association with a predetermined portion (for example, the top of the head) of the character object 110.

In addition, a particular object is displayed in the video as a gift object or other object. Display of a particular object 120A may be requested by the viewing user operating the gift selector 112. Alternatively, the particular object 120A may be displayed in the video by the operation of the controller 40 or the like by the actor, or the operation of the supporter computer 45 by the supporter.

The particular object 120A may be arranged at a predetermined position. Alternatively, the actor or supporter may be able to place the particular object 120A at an arbitrary position in the virtual space. The particular object 120A may be arranged not only at a surface at which the character object 110 has arrived, but also at any position in the virtual space. Further, the particular object 120A may be set as an object that can collide with another object displayed in the virtual space, or may be set as an object that does not collide. Further, the particular object 120A may be set to avoid a collision with a predetermined object. For example, when a plurality of particular objects 120A is arranged in the virtual space, it is not necessary to generate a movement associated with a collision (contact) between the particular objects 120A. Further, when a particular object 120A collides with another particular object, a first movement may be generated, and when the particular object 120A collides with an object other than the other particular object, a second movement different from the first movement may be generated.

Figure 8:
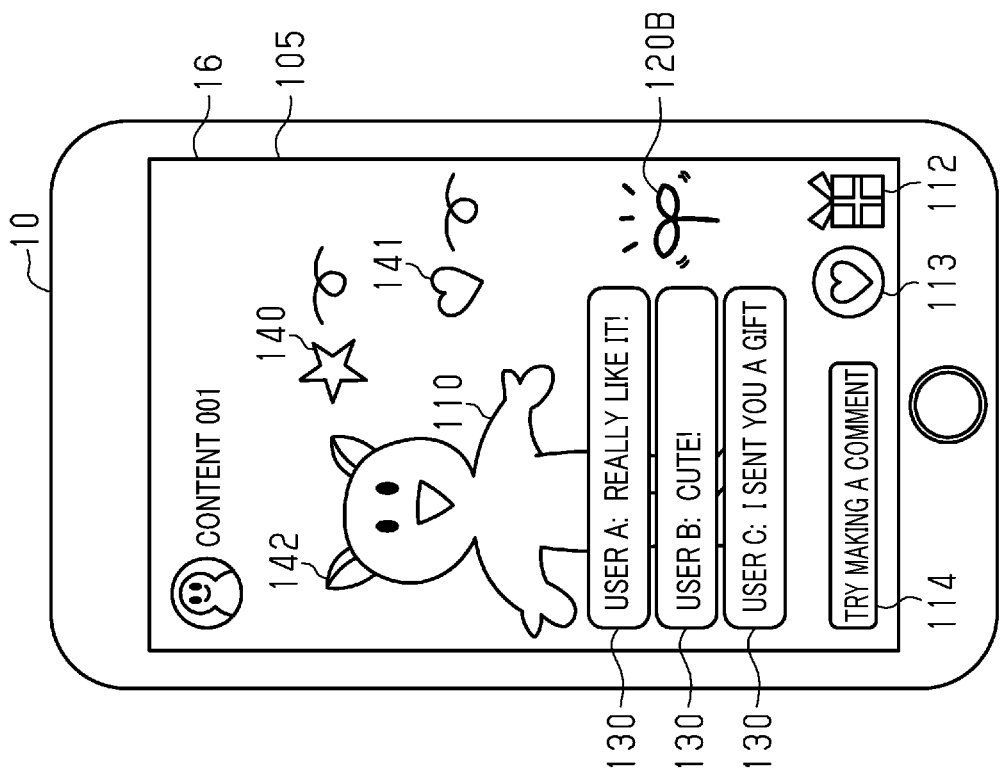
FIG. 8 is a diagram showing an example of a screen in which the particular object changed from the initial state of FIG. 7.

As shown in FIG. 8, when the change condition has been satisfied, the display mode of the particular object 120A changes and is displayed as a particular object 120B. Additionally, the illustrated content distributes the video to the client device(s) over a plurality of distribution times. The distribution time of the video displaying a particular object of a "seed" display mode shown in FIG. 7 is different from the distribution time of the video displaying a particular object of a "bud" display mode. That is, both videos are distributed at different distribution times.

The change condition is stored in the storage 23. The change condition may be set for each particular object 120A, or may be set for each drawing data of the same particular object 120A. An example of the change condition relates to a distribution status of the video. For example, the change condition is that (i) a predetermined period has elapsed since the placement of the particular object 120A was started, or (ii) the number of times of distribution of the content has reached the predetermined number of times of distribution. Alternatively, the change condition is that a predetermined period has elapsed from the latest growth of the particular object 120A, or that the number of times of distribution of the content has reached a predetermined number of times of distribution. Specifically, when "24 hours" have elapsed since the particular object 120A was placed in the virtual space, the particular object 120A can change from the "seed" display mode to the "bud" display mode of the particular object 120B. Alternatively, the particular object 120A can change from the "seed" display mode to the "bud" display mode in a distribution time after a predetermined number of times starting from the distribution time of the content in which the particular object 120A is arranged in the virtual space. When the video is generated according to a command of the distributor under a state where the particular object can change, the particular object 120A changes to the particular object 120B in the next stage.

The change condition may be other than the distribution status of the video. For example, it may be a condition related to the activity or viewing status of the viewing user(s). A condition related to viewing the video is, for example, that (i) the cumulative number of viewing users who have viewed the content from the first time has reached a predetermined number of people, (ii) the number of viewing users who have registered the content in a predetermined category such as "Favorites (Like)" has reached the predetermined number of people, (iii) the total viewing time, which is the cumulative viewing time of all viewing users from the first time, has reached a predetermined time, (iv) the cumulative number of messages to the content in the latest distribution or the predetermined distribution from the first time has reached a predetermined number of messages, (v) the cumulative number of gift objects, which is the cumulative number of gift objects for which display requests have been made, has reached a predetermined number, (vi) the number of simultaneous viewing users or the number of visits has reached a predetermined value, or the like. Specifically, when the cumulative number of viewing users from the first time reaches "100," the particular object may be able to change from the "seed" state to the "bud" state. Additionally, the change condition may be other than these conditions.

As the progress of the video thus progresses, the display mode of the particular object changes, so that the viewing user is interested in the change of the particular object and watches the video. As a result, the number of viewing users and the like can be increased. In particular, when the display mode of the particular object changes over a plurality of distributions, the number of repeat viewers increases, so that the number of viewings, viewing time, and the like can be increased.

The change in the display mode of the particular object 120A may have a branch depending on the activity of the viewing user(s) or the distribution status of the video. The activities of the viewing user(s) include (i) posting a message by the viewing user(s), (ii) requesting the display of a gift object, and the like. Further, as long as it does not overlap with the change condition, the activity of the viewing user(s) may be the viewing status (number of viewing users, viewing time, and the like) of the content.

Figure 9B:
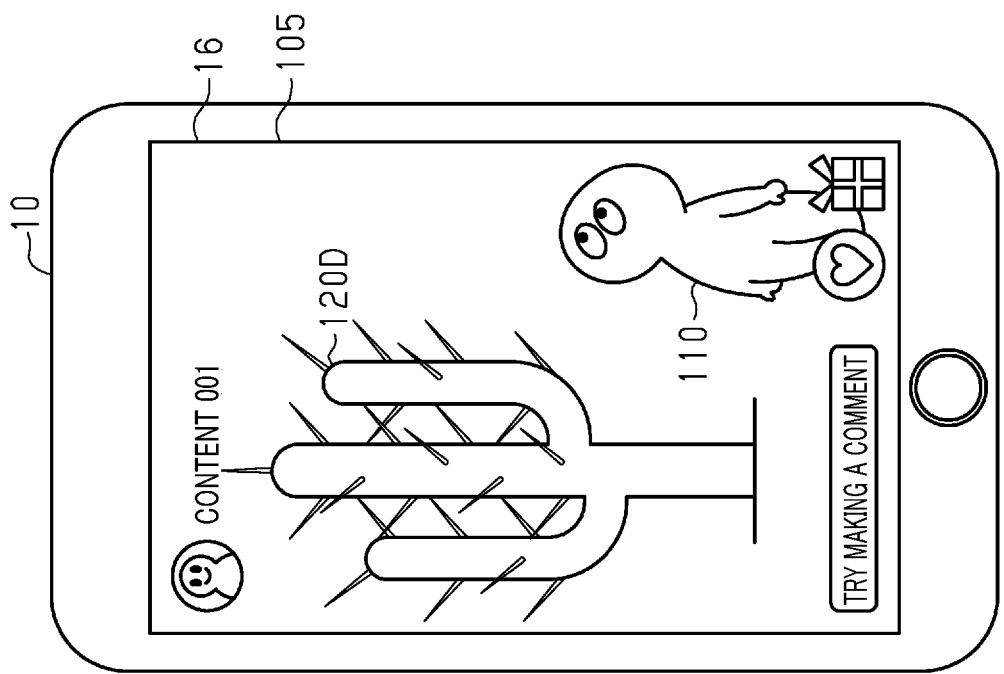
FIG. 9B is a diagram showing an example of a video viewing screen when there are many messages of a second attribute.
Figure 9A:
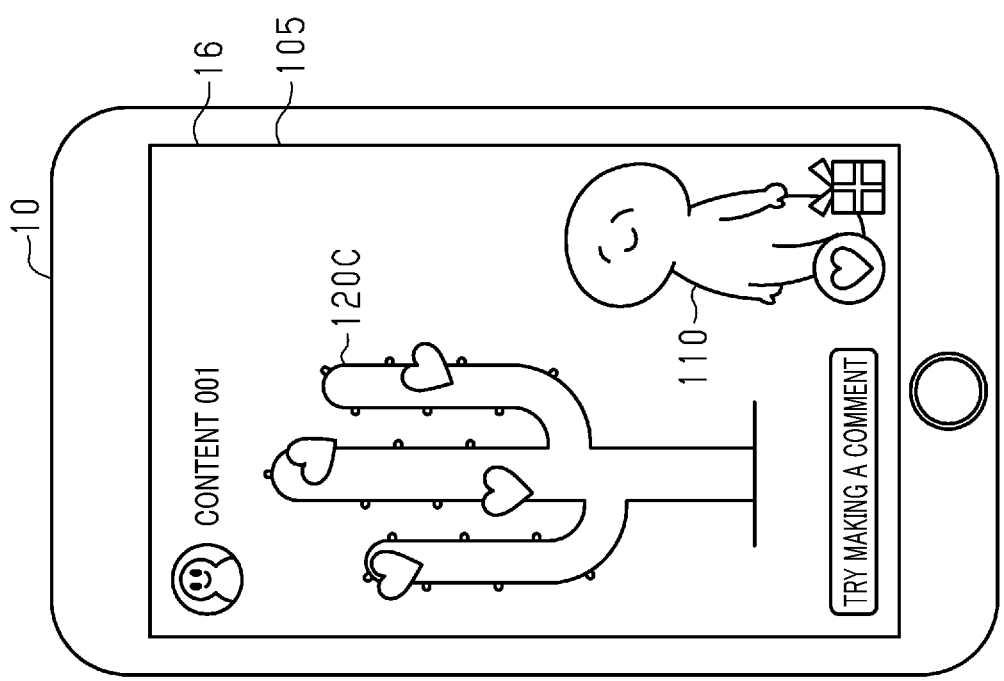
FIG. 9A is a diagram showing an example of a video viewing screen when there are many messages of a first attribute.

With reference to FIGS. 9A to 9B, a case will be described in which the display mode has a branch according to the posting of a message by the viewing user. The object processor 21E analyzes the messages 130 and determines whether the content of the messages belongs to the first attribute or the second attribute. Further, the object processor 21E calculates the number of messages 130 belonging to the first attribute and the number of messages 130 belonging to the second attribute, and compares the numbers. The object processor 21E changes the display mode of the particular object 120A according to the attribute of the larger number of messages.

FIG. 9A is the video viewing screen 105 when there are more messages belonging to the first attribute "positive." For example, a particular object 120C is a "cactus" on which "heart" flowers have bloomed.

FIG. 9B is the video viewing screen 105 when there are more messages belonging to the second attribute "negative." For example, a particular object 120D is a "cactus" with long "thorns."

Thus, since the activity of the viewing user can be reflected in the display mode of the particular object, the viewing user can actively participate in the content. As a result, communication between the distributor and the viewing user can be facilitated, so that the number of new viewing users and/or repeat viewers of the content can be increased. Further, for example, an actor (character) can notify the viewing user in advance of how a particular object will change in a display mode when there are many messages of each attribute. As a result, the viewing user will post a message(s) more actively in order to change the particular object to the display mode that s/he expects. The distributor can make the growth of a particular object a popular topic of conversation. Therefore, it is possible to support the distributor by changing the display mode of the particular object.

Figure 10:
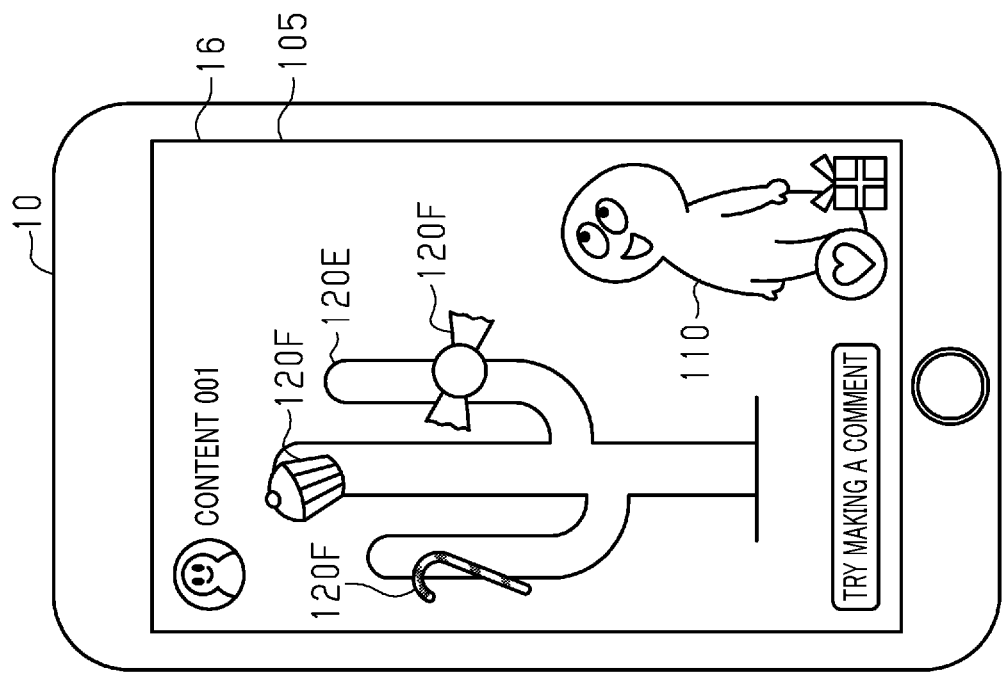
FIG. 10 is a diagram explaining a display mode of a particular object of "fruiting" on the video viewing screen.

Next, with reference to FIG. 10, a state will be described in which the stage of changing the display mode of the particular object is further advanced. In the illustrated embodiment, the particular object has changed to a "fruiting" display mode. That is, a particular object 120E is displayed in a display mode including deliverables 120F. That is, the particular object 120E is displayed together with the deliverables 120F. The video distribution system 1 may treat the deliverables 120F as a medium of electronic data that can be used in the same content or on a platform that distributes the content. At this time, the viewing user or the distributor acquires, owns, uses, manages, exchanges, combines, enforces, sells, disposes, gifts, or the like the deliverables 120F through the operation of a client device 10 or the supporter computer 45. The deliverables 120F may be able to be used as a gift object for the video or other video in which each of the deliverables 120F is generated. The deliverables 120F are, for example, items having a high value such as rarities, an item with the name of the distributor, or the like.

A case will be described in which the deliverables 120F of the particular object 120E are given to a viewing user. The object processor 21E executes the giving of the deliverables 120F, for example, at a harvesting event in the video. The object processor 21E identifies a viewing user who is viewing the harvesting event. Further, the object processor 21E adds data related to the deliverables 120F to the possession list 23D of the identified viewing user, and associates the deliverables 120F with the viewing user. Data (components) for determining physical behavior may be set in the deliverables 120F. At the harvesting event, the object processor 21E may execute a process in which the deliverables 120F exhibits physical behavior, and may associate the deliverables 120F with the viewing user or the like. For example, when the deliverables 120F are harvested, the deliverables 120F may move vertically downward in the virtual space as if gravity were acting on the deliverables 120F. Alternatively, when the object processor 21E, for example, determines a collision between the hand or the like of the character object and the deliverables 120F and determines that the positional relationship between the character object and the deliverables 120F satisfies a predetermined relationship, the character object may be displayed to hold the deliverables 120F. Further, the deliverables 120F may be placed at a predetermined position with respect to the character object.

Further, a new particular object (deliverable) such as "seed" may be generated from a particular object in the final stage such as "fruiting." The new particular object of the "seed" may be used within the same content or in other content. Alternatively, a new particular object such as "seed" may be exchanged, sold or gifted on the platform on which the content is distributed. Thus, by giving the viewing user a new particular object that can be used by the viewing user, it is possible to enhance the advantage of giving the viewing user a particular object.

Further, when a change condition has been satisfied in the particular object of the display mode of "fruiting", the particular object may not be displayed. Alternatively, the particular object may not be displayed via a following display mode such as "wither."

Figure 11:
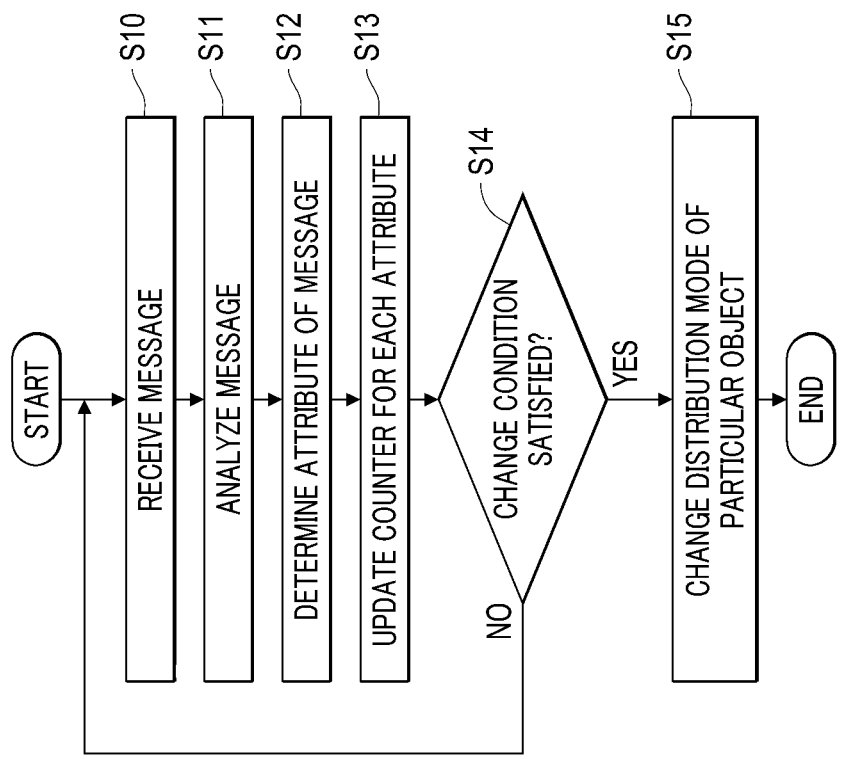
FIG. 11 is a flowchart showing a processing procedure of the server of FIG. 3.

With reference to FIG. 11, a processing procedure for changing the display mode of the particular object will be described.

The user request processor 21D receives a message transmitted from the client device 10 of a viewing user (step S10). The user request processor 21D displays the received message on the video.

Further, the object processor 21E analyzes the content of the message (step S11) and determines the attribute of the message that has been analyzed (step S12). For example, a positive message such as "cute" is determined to belong to "positive (first attribute)." In addition, a negative message such as "dislike" is determined to belong to "negative (second attribute)."

Further, the object processor 21E updates a counter for each attribute (step S13). For example, when the object processor 21E determines that the message that is the subject of the determination belongs to the first attribute, the object processor 21E increments the counter belonging to the first attribute.

Further, the object processor 21E determines whether the change condition of the particular object has been satisfied (step S14). The change condition may be that the value of the counter is equal to or higher than a threshold value, in addition to the change condition described above.

When the object processor 21E determines that the change condition has been satisfied (it is the timing for growth) (step S14: YES), the object processor 21E changes the display mode of the particular object (step S15). Specifically, the object processor 21E reads out the object data 23B and changes the display mode of the particular object being displayed to the display mode of the next stage. On the other hand, when the object processor 21E determines that the change condition has not been satisfied (it is not the timing for growth) (step S14: NO), the program returns to step S10 and repeats the above process.

As described above, according to the above embodiment, the following advantages can be obtained.

(1) In the video distributed to the client devices, the display mode of the particular object changes according to the activity of the viewing user(s). That is, the viewing user(s) can actively participate in the content. Thus, it is possible to increase the number of viewing users, the number of viewings, or the viewing time of the content.

(2) The display mode of the particular object changes according to the message(s) posted to the video. As a result, the viewing user(s) can be motivated to post a message(s), so the viewing user(s) can actively participate in the content.

(3) When the particular object reaches the "fruiting" display mode, the deliverables 120F displayed on the particular object are associated with the viewing user(s). Thus, it is possible to give the viewing user(s) a motivation to perform an activity that changes the display mode of the particular object to "fruiting."

(4) When the particular object is a gift object requested to be displayed by a viewing user, the viewing user can be actively involved in the content of the video. Therefore, provision of the gift object by the viewing user can be activated.

Second Embodiment

Next, a second embodiment of the video distribution system will be described. In the second embodiment, the process of branching the display mode of the particular object is different from that of the first embodiment. Hereinafter, the same portions as those in the first embodiment are designated by the same reference numerals, and detailed description thereof will be omitted.

In this embodiment, the display mode of the particular object is branched according to the gift object for which the viewing user has requested the display.

Figure 12:
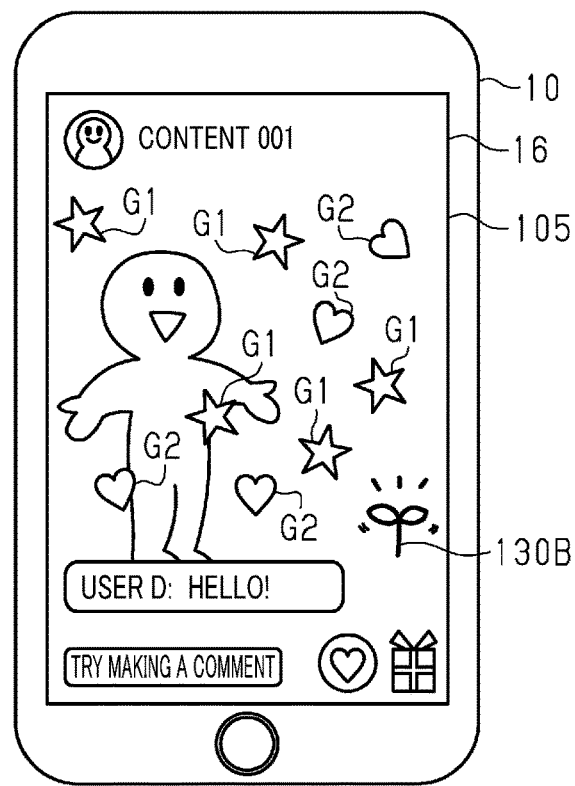
FIG. 12 is a diagram showing an example of a video viewing screen on which a particular object changed.

As shown in FIG. 12, on the video viewing screen 105, gift objects requested to be displayed by the viewing user are displayed together with a particular object 130B. The object processor 21E changes the display mode of the particular object according to the type or attribute of the largest number of gift objects among all the requested gift objects, or among the gift objects displayed in the video. For example, the object processor 21E compares the number of "star" gift objects G1 with the number of "heart" gift objects G2, which are gift objects requested to be displayed within a predetermined period. The predetermined period may be a period from the beginning of distribution of the content, a predetermined distribution time, or a predetermined time slot set for a predetermined distribution time.

Figures 13A, 13B:
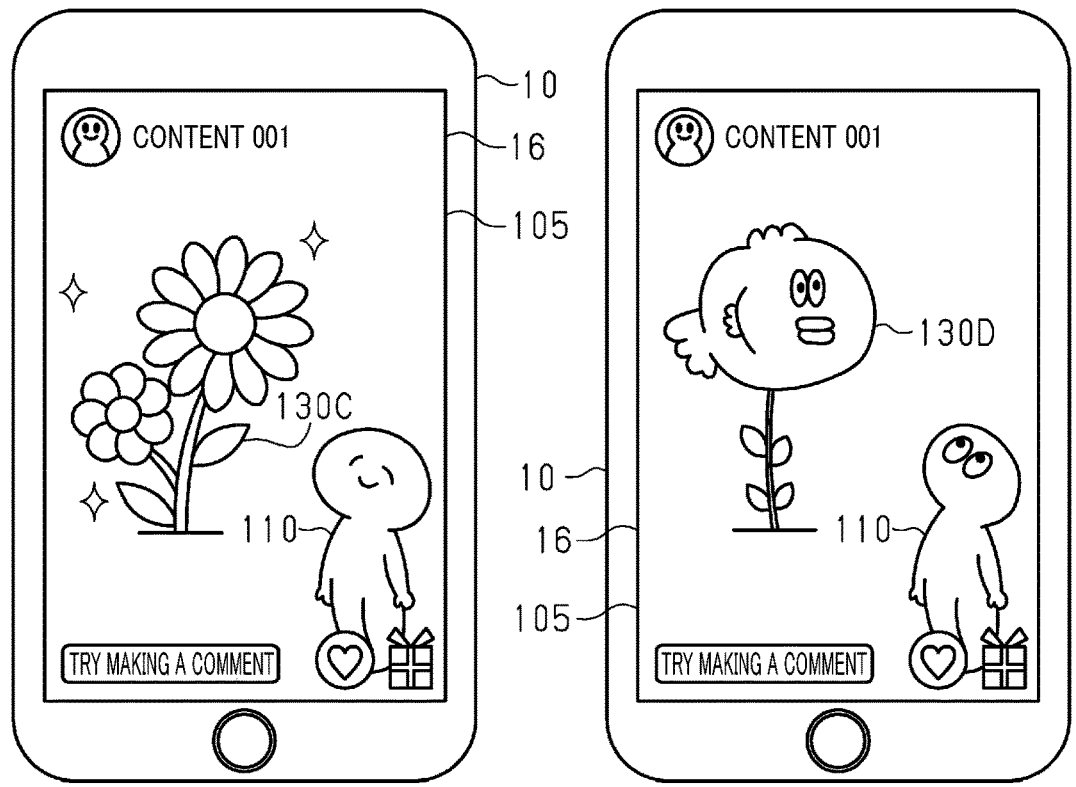
FIG. 13A is a diagram showing a video viewing screen when a particular type of gift object is provided most.
FIG. 13B is a diagram showing a video viewing screen when another type of gift object is provided most.

As shown in FIG. 13A, when the number of display requests for the "heart" gift objects is larger than the number of display requests for other gift objects, a particular object 130C is displayed in a display mode that flowers have bloomed.

As shown in FIG. 13B, when the number of display requests for the "star" gift objects is larger than the number of display requests for other gift objects, a particular object 130D is displayed in a display mode in which a flower different from the flowers that have bloomed when there are many "hearts" has bloomed.

Figure 14:
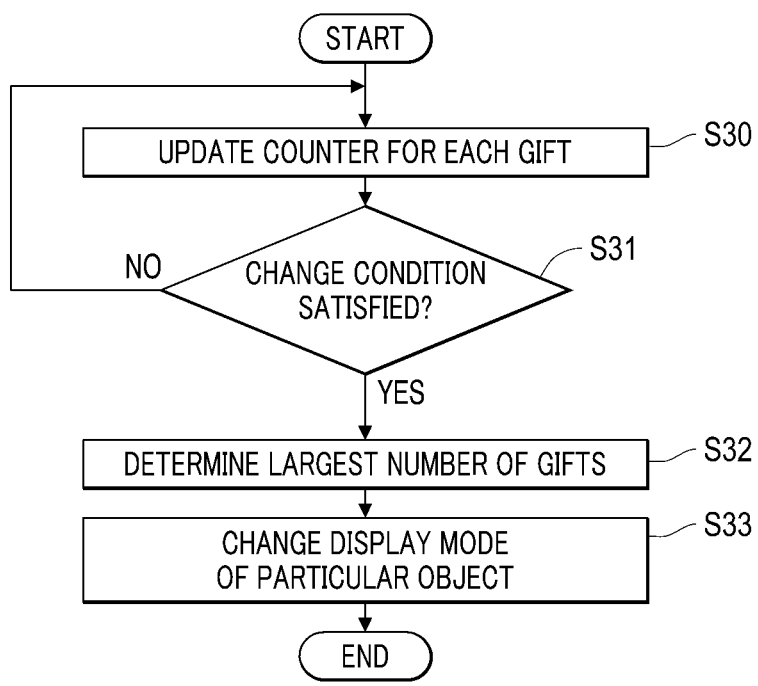
FIG. 14 is a flowchart showing a processing procedure of a server according to a second embodiment.

With reference to FIG. 14, a process of branching the display mode of the particular object according to the type of the gift object will be described. When a client device 10 receives an input operation of a display request by a viewing user, it transmits the display request to the server 20. When counters are set for the gift objects for which display requests have been made, the object processor 21E updates the counter for each gift object (step S30).

The object processor 21E determines whether a change condition of the particular object has been satisfied (step S31). The change condition may be that the value of the counter is equal to or higher than a threshold value, in addition to the change condition described above. When the object processor 21E determines that the change condition has not been satisfied (step S31: NO), the process returns to step S30.

On the other hand, when the object processor 21E determines that the change condition has been satisfied (step S31: YES), it determines the gift object having the largest number of display requests based on the value of the counter (step S32). The object processor 21E determines, for example, that the number of display requests for the "heart" gift object is the largest among the gift objects. Then, the object processor 21E changes the display mode of the particular object according to the gift object having the largest number of display requests (step S33). For example, when the number of display requests for the "heart" gift object is the largest, the particular object is displayed in a display mode that flowers have bloomed.

As described above, according to this embodiment, the following advantage can be obtained in addition to at least part of the advantages described in the above-described embodiment.

(5) The display mode of the particular object changes according to the gift object having the largest number of display requests. Thus, it is possible to motivate the viewing user(s) to act to change the display mode of the particular object. As a result, the viewing user(s) can actively participate in the content.

Third Embodiment

Next, a third embodiment of the video distribution system will be described. In the third embodiment, the process of changing the display mode of the particular object is different from that of the first embodiment. Hereinafter, the same portions as those in the first embodiment are designated by the same reference numerals, and detailed description thereof will be omitted.

In this embodiment, the display mode of the particular object is changed according to the distribution status of a video of a distributor.

Figure 15B:
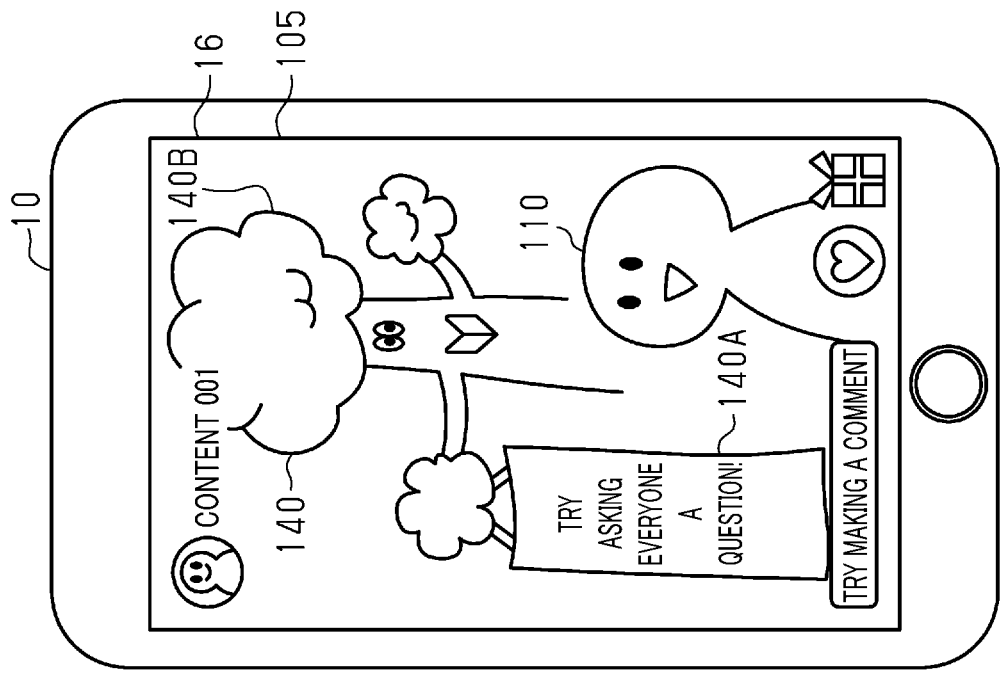
FIG. 15B is a diagram showing an example of a video viewing screen distributed by a distributor at a second level.
Figure 15A:
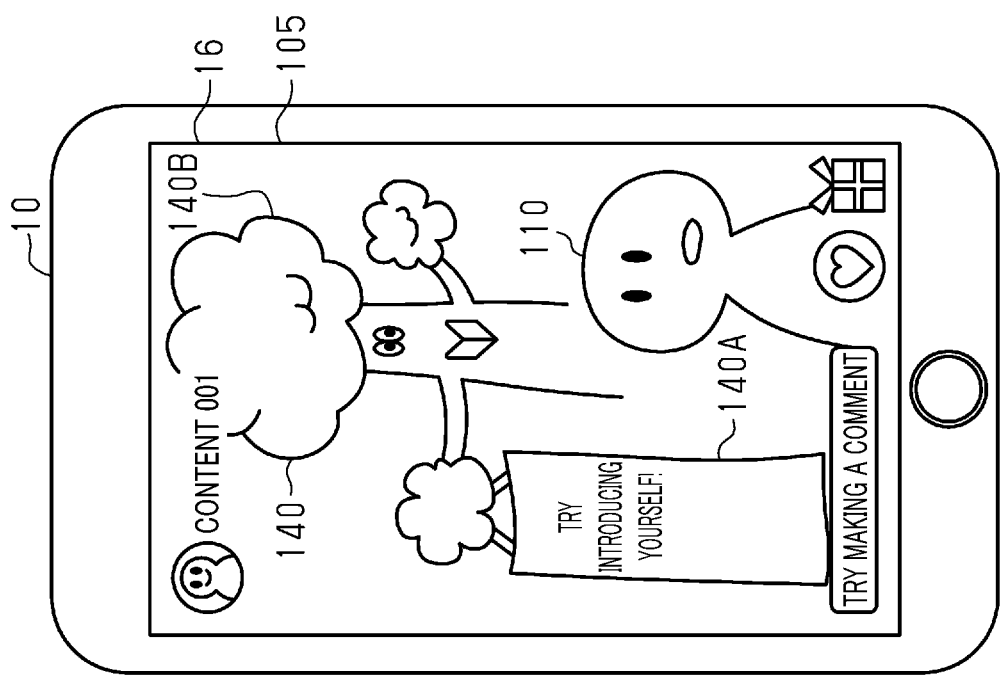
FIG. 15A is a diagram showing an example of a video viewing screen distributed by a distributor at a first level.

As shown in FIG. 15A, a particular object 140 is an object for supporting the distributor and providing the distributor with advice on video distribution. In the illustrated embodiment, the particular object 140 is a particular object that imitates a tree 140B having a display medium 140A (hanging scroll, board) displaying advice to the distributor. The display medium 140A describes a theme of conversation recommended by the management side (for example, "Try introducing yourself!", "Try asking everyone a question", or the like), the recommended content of the performance, and the like.

The object processor 21E refers to the distributor data 23G and acquires advice from the storage 23 according to the level of the distributor and the distribution status of the video. Then, the object processor 21E displays the advice on the display medium 140A. A particular object 150 of the illustrated embodiment posts advice when the level is relatively low.

When the actor adopts the advice described in the display medium 140A, s/he proceeds with the distribution of the video according to the advice. For example, an actor introduces herself/himself or asks a question to a viewing user. The object processor 21E may erase the display medium 140A after displaying it for a predetermined time.

As shown in FIG. 15B, the object processor 21E changes the display mode of the particular object 150 when a change condition has been satisfied. For example, the content of the advice described on the display medium 140A is changed according to the level of the distributor.

Figure 16:
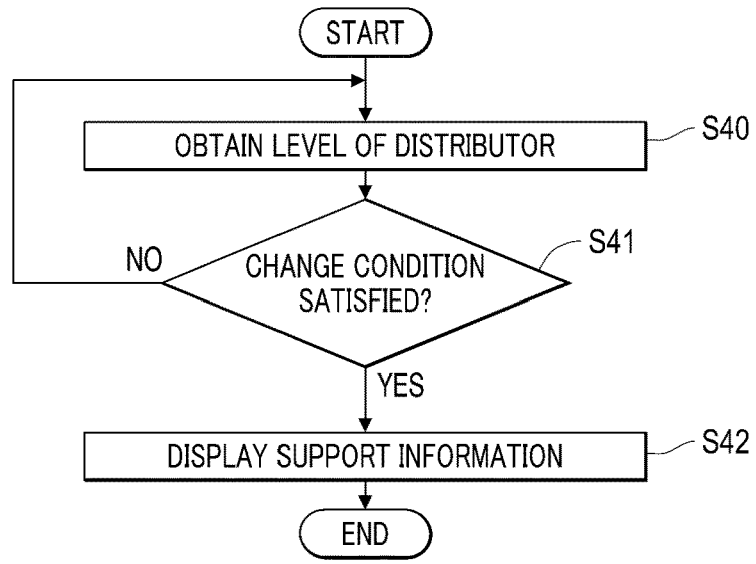
FIG. 16 is a flowchart showing a processing procedure of a server according to a third embodiment.

With reference to FIG. 16, a processing procedure for changing the display mode of a particular object according to the level of the distributor will be described. The object processor 21E acquires the level of the distributor (step S40). The timing of acquiring the level may be when the distribution of the video is started or when the distribution of the video is finished. Based on the acquired level, the object processor 21E determines whether a change condition regarding the level has been satisfied (step S41). The change condition in this case is that (i) the level has increased by one step, (ii) the level has reached a predetermined level, (iii) a predetermined time or a predetermined number of distributions have elapsed since the level changed, or the like. Alternatively, the change condition may be a condition related to the number of viewing users, a condition related to a movement or utterance of the actor, or any of the conditions described in each of the above embodiments.

When the object processor 21E determines that the acquired level does not satisfy the change condition (step S41: NO), the process returns to step S40. When the object processor 21E determines that the acquired level satisfies the change condition (step S41: YES), support information that supports the distributor is displayed (step S42). For example, the object processor 21E changes the display medium 140A of the particular object 150. When the support information is displayed, the process returns to step S40, and the above process is repeated.

As described above, according to this embodiment, the following advantage can be obtained in addition to at least part of the advantages described in the above-described embodiment.

(7) As a particular object, the display medium 140A is displayed in which advice to the distributor is described. As a result, even a distributor who has just started distributing the video can perform acting or the like in accordance with the advice, so that a barrier to distributing the video and continuing the distribution can be lowered. Further, even if the distributor has a large number of distributions of the video, the distribution contents are likely to be duplicated as the distributions are repeated, so a video with new contents can be distributed by incorporating the advice into the video.

Each of the above embodiments can be modified and implemented as follows. These embodiments and the following modified examples can be implemented in combination with each other within a technically consistent range.

Figure 17:
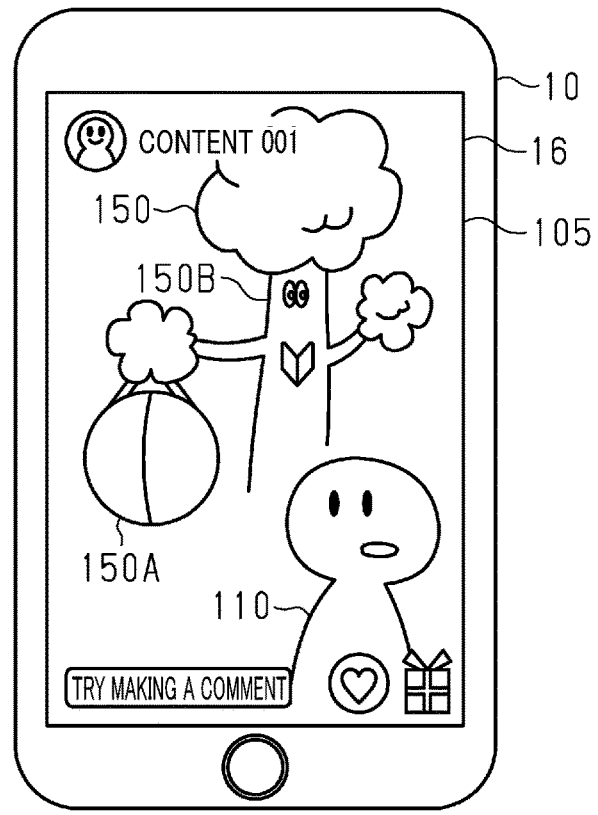
FIG. 17 is a diagram showing an example of a video viewing screen which a particular object is displayed with deliverables.

As shown in FIG. 17, as a deliverable 150A, a particular object 150 may have a medium (for example, a decorative paper ball) which is given to the viewing user or the distributor and is unknown until a harvesting event occurs. When the harvesting event occurs, the object processor 21E displays the medium given to the viewing user or the distributor. For example, an effect is produced such that an object (item, gift object, ticket, or the like) appears from the deliverable 150A of, for example, a "decorative paper ball." Then, the object processor 21E associates the object obtained from the deliverable 150A with (i) a viewing user who has watched the harvesting event or a video including the harvesting event, or (ii) the distributor. According to this, at least some of the viewing users will view the deliverable 150A until the contents of the deliverable 150A are clarified, so that the number of viewings, the viewing time, and the like can be increased.

Figure 18A:
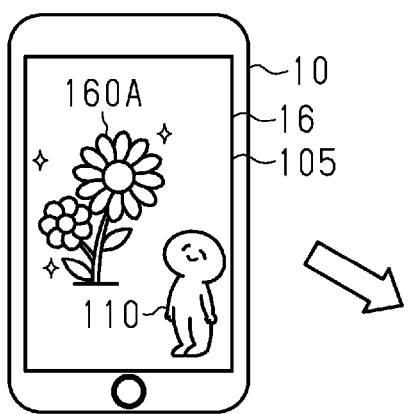
FIG. 18A is a diagram showing a video viewing screen on which a first particular object is displayed.
Figure 18B:
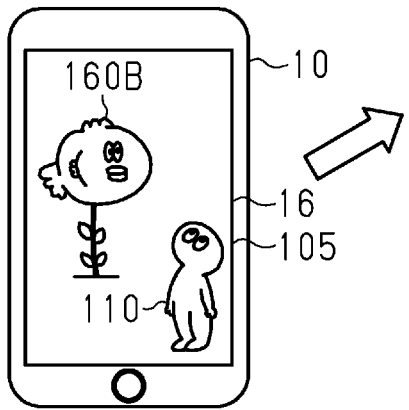
FIG. 18B is a diagram showing a video viewing screen on which a second particular object is displayed.
Figure 18C:
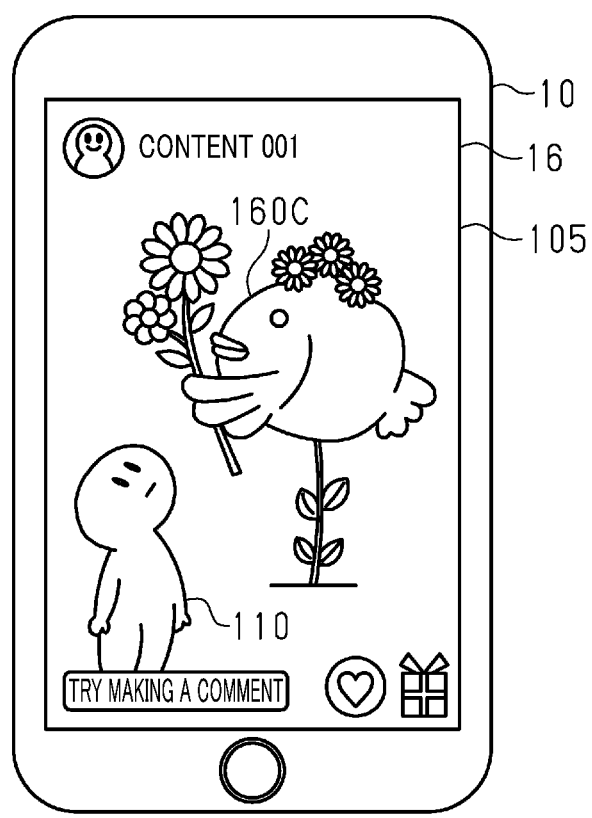
FIG. 18C is a diagram showing a video viewing screen displaying a particular object generated by combining the first particular object with the second particular object.

As shown in FIGS. 18A to 18C, a plurality of particular objects may be combined. FIG. 18A shows a particular object 160A displayed in a content distributed by a "distributor A." FIG. 18B shows a particular object 160B displayed in a content distributed by a "distributor B." When the server 20 receives a command to combine particular objects from a terminal used by the distributor and a terminal used by the distributor, the server 20 combines the particular object 160A of the "distributor A" with the particular object 160B of the "distributor B", generates a particular object 160C (FIG. 18C), and displays the particular object 160C on the video viewing screen 105. In addition, even if there are not particular objects of different distributor, if there is a plurality of particular objects in the content, one distributor may combine these particular objects. In this case, the viewing user can be given an expectation and interest in not only the change in the display mode of the particular object, but also in the change in the display mode due to the combination. The particular object 160C is an identifiable object in which at least part of the particular object 160A and at least part of the particular object 160B are combined (coupled). For example, a shape of the at least part of the particular object 160A may be changed according to the combination. Color of the at least part of the particular object 160A may be changed according to the composition. Similarly, a shape of the at least part of the particular object 160B may be changed according to the combination, and color of the at least part of the particular object 160B may be changed according to the combination.

In each of the above embodiments, the growth process of the particular object branches according to the activity of the viewing user(s) and the video distribution status of the distributor. Alternatively, the growth process of a particular object may be in multiple stages without branching. Even in this case, if the change condition is related to the activity of the user(s), the display mode of the particular object changes according to the activity of the viewing user(s). Therefore, the viewing user(s) can actively participate in the content.

When the change condition of the particular object has been satisfied, the server 20 may change the display mode of the particular object according to the date and time information at that time. For example, when the time of the change condition being satisfied is "April," the display mode of the particular object may include "cherry" blossoms, while when the time of the change condition being satisfied in the particular object under the same conditions is "August," it may include "sunflowers." The date and time information is not limited to the "year/month/day" but may be the "time."

When the change condition of the particular object has been satisfied, the server 20 may acquire information about the external environment at that time and change the display mode of the particular object based on the acquired information about the external environment. Information about the external environment includes weather, temperature, information about the location(s) at which the client devices 10 are located, and the like. The server 20 may acquire information about the external environment from the client devices 10 or from another server such as an external server. For example, the server 20 acquires position information from the client devices 10 when the change condition has been satisfied, and acquires the weather corresponding to the position information from the external server. When the weather corresponding to the position information is "rain," the server 20 may display a particular object including an umbrella, or may dynamically display raindrop particles or the like around the particular object.

In the above embodiments, the change condition is stored in the storage 23. Instead, the change condition may be stored in the storage 48 of the supporter computer 45 or a storage of an information processing terminal used by the distributor who distributes the video.

In the above embodiments, the display mode of the particular object changes according to the activity of the actor. Instead of or in addition to this, the display mode may be changed according to the distribution status of the video. For example, when the number of distributions reaches "10 times," the flowers of "10" particular objects may be displayed, and when the number of distributions reaches "20 times," the flowers of "20" particular objects may be displayed.

One particular object may be displayed in the video, or a plurality of particular objects may be displayed.

In the third embodiment, when the change condition has been satisfied, the support information according to the level of the distributor was displayed. Any piece of a plurality of support information may be selected according to the state of the actor when the change condition was satisfied. For example, the server 20 stores a plurality of support information in the storage 23, and the object processor 21E acquires information about the state of the actor when the change condition was satisfied. For example, the object processor 21E acquires information about the movement of the actor, based on various parameters acquired from each of the worn sensors 33, such as the moving distance of the actor from the initial position and the number of times the arm is waved. When it is determined that the motion of the actor is small based on various parameters, the object processor 21E displays support information such as "Try dancing" in order to increase the motion. When it is determined that the motion of the actor is sufficiently large, the object processor 21E displays another support information or does not display support information. Alternatively, the object processor 21E calculates the utterance amount or the non-utterance (silence) time, based on the voice of the actor input from the microphone 44. The object processor 21E displays support information such as "Try singing" to increase the utterance amount when it is determined that the utterance amount of the actor is small, and when it is determined that the utterance amount of the actor is sufficiently large, the object processor 21E displays other support information or does not display support information.

The particular object (growth object) may be an object other than the object(s) described in the above embodiments. For example, an object (potted plant) or the like may be used that grows when the number of continuous viewing users who continuously watch the video distributed at each distribution time reaches incremental predetermined numbers of people ("100 people", "200 people").

In one embodiment, a large number of infrared LEDs are installed on the actor and each of the plurality of worn sensors 33 worn on the actor. By detecting the light from the infrared LED with an infrared camera provided on the floor or wall of the studio room R, the position and orientation of each of the worn sensors 33 may be detected. Visible light LEDs may be used instead of infrared LEDs, and the position and orientation of each of the worn sensors 33 may be detected by detecting the light from the visible light LEDs with a visible light camera. Thus, a light emitter (for example, an infrared LED or a visible light LED) may be provided in each of the plurality of worn sensors 33 worn on the actor, and the light from the light emitters may be detected by a light receiver (for example, an infrared camera or a visible light camera) provided in the studio room, thereby detecting the position and orientation of each of the worn sensors 33. In one embodiment, a plurality of reflective markers can be used instead of the worn sensors 33. Reflective markers are attached to each actor or provided as part of the clothing (suit) worn by the actor(s). By thus providing the reflective marker on the actor, the actor can be photographed to generate photographed data, and the position and orientation of the reflective markers can be detected by performing image processing on the photographed data. Further, the tracking system 31 may be capable of detecting the movement of the actor only by the external sensor(s) 32 without using the worn sensor(s) 33.

Each of the above embodiments and each of the above modifications can be combined.

As a program that can be executed by a calculator (computer), the method described in the embodiment can be stored in, for example, (i) a storage medium such as a magnetic disk (floppy (registered trademark) disk, hard disk, or the like), an optical disk (CD-ROM, DVD, MO, or the like), or a semiconductor memory (ROM, RAM, flash memory, or the like) or (ii) a non-transitory computer-readable storage medium, or can be transmitted and distributed by a communication medium. The program stored on the medium side also includes a setting program for configuring, in the calculator, software means (including not only an execution program, but also a table/data structure) to be executed by the calculator. The calculator that realizes this device reads a program recorded on a storage medium, constructs software means by a setting program in some cases, and executes the above-described processing by controlling the operation by the software means. The storage medium referred to in this specification is not limited to distribution, and includes a storage medium, such as a magnetic disk and a semiconductor memory, provided in a device inside the calculator or connected via a network.

The computer processors 12, 21, and 46 are not limited to performing software processing for all the processing executed by themselves. For example, the computer processors 12, 21, and 46 may include a dedicated hardware circuit (for example, an application-specific integrated circuit: ASIC) that performs hardware processing for at least part of the processing executed by themselves. That is, the computer processors 12, 21, and 46 can be configured as a circuit (circuitry) that includes (1) one or more processors that operate according to a computer program (software), (2) one or more dedicated hardware circuits that execute at least part of various processes, or (3) a combination thereof. The processors include a CPU and a memory such as a RAM and a ROM, and the memory stores a program code or commands configured to cause the CPU to execute the processes. A memory or computer-readable medium includes any available medium accessible by a general purpose or dedicated computer.

The invention claimed is:

1. A video distribution system that distributes video data including an animation of a virtual character object generated based on movement of an actor, the video distribution system comprising:
    a server that distributes the video data; and
    a plurality of information processing terminals in each of which an application for viewing a video based on the video data is implemented, and each of which is a device used by a respective viewing user, wherein
    the server
        generates the video data including (i) the virtual character object and (ii) a particular object that changes a display a plurality of times,
        transmits the video data to the information processing terminals,
        receives, from at least one of the information processing terminals, a message for the video, and
        causes the message to be displayed and causes the display of the particular object displayed in the video to be changed according to the message, and
    the server further receives a plurality of the messages, determines whether the majority of the messages includes content of a positive attribute or a negative attribute, and causes the display of the particular object to be changed differently depending on whether the majority of the messages includes content of the positive attribute or content of the negative attribute.

2. The video distribution system according to claim 1, wherein
    the at least one information processing terminal transmits, to the server, a display request for a gift object, based on an input to an input portion of the at least one information processing terminal by the respective viewing user, and
    the server causes the display of the particular object to be changed according to the gift object.

3. The video distribution system according to claim 1, wherein
    the at least one information processing terminal transmits, to the server, a display request for the particular object as a gift object for the video, and
    the server causes the particular object to be displayed in the video according to the display request.

4. A video distribution system that distributes video data including an animation of a virtual character object generated based on movement of a distribution user, the video distribution system comprising:

a server that distributes the video data;

a memory that stores an activity of each of a plurality of viewing users and/or an activity of the distribution user during distribution of the video data; and a plurality of information processing terminals in each of which an application for viewing a video based on the video data is implemented, and each of which is used by a respective viewing user, wherein the server generates the video data including (i) the virtual character object and (ii) a particular object that irreversibly changes a display, a plurality of times, from an initial form to a final form, transmits the video data to the information processing terminals, and causes the display of the particular object displayed in the video to be changed according to the activity, wherein the activity includes at least one of a request to display a gift object by one of the viewing users, the number of viewing users viewing the video, the viewing time of the viewing users viewing the video, and a distribution status of the video, and the same particular object is displayed before and after the display is caused to be changed.

5. The video distribution system according to claim 4, wherein when the particular object reaches the final form, the server causes the display of the particular object in the video to be displayed as including a deliverable, associates the deliverable with the respective viewing user of the video, and stores the deliverable in the memory.

6. The video distribution system according to claim 4, wherein when the particular object reaches the final form, the server generates a new particular object of the initial form associated with the particular object.

7. The video distribution system according to claim 6, wherein the server associates the new particular object with the respective viewing user, receives, from at least one of the information processing terminals, a display request for the new particular object with respect to a video different from the video in which the new particular object was generated, and causes the new particular object to be displayed in the different video based on the display request.

8. A video distribution system that distributes video data including an animation of a virtual character object generated based on movement of a distribution user, the video distribution system comprising:

a server that distributes the video data;

a memory that stores an activity of each of a plurality of viewing users and/or an activity of the distribution user during distribution of the video data; and a plurality of information processing terminals in each of which an application for viewing a video based on the video data is implemented, and each of which is a device used by a respective viewing user, wherein the server generates the video data including (i) the virtual character object and (ii) first and second particular objects each of which changes a display a plurality of times, transmits the video data to the information processing terminals, receives, from at least one of the information processing terminals, information regarding the activity, causes the display displayed in the video to be changed according to the activity, wherein the activity includes at least one of a request to display a gift object by one of the viewing users, the number of viewing users viewing the video, and the viewing time of the viewing users viewing the video, and the same first and second particular objects are displayed before and after the display is caused to be changed, and generates a combined particular object based on the first and second particular objects and causes the combined particular object to be displayed in the video.

9. A video distribution method for distributing video data including an animation of a virtual character object generated based on movement of an actor, the video distribution method comprising:

generating the video data including (i) the virtual character object and (ii) a particular object that changes a display a plurality of times;

transmitting the video data to a plurality of information processing terminals in each of which an application for viewing a video based on the video data is implemented, and each of which is a device used by a respective viewing user;

receiving, from at least one of the information processing terminals, a message for the video; and causing the message to be displayed and causing the display of the particular object displayed in the video to be changed according to the message, wherein a plurality of the messages is received, it is determined whether the majority of the messages includes content of a positive attribute or a negative attribute, and the display of the particular object is caused to be changed differently depending on whether the majority of the messages includes content of the positive attribute or content of the negative attribute.

10. The video distribution method according to claim 9, further comprising receiving, from the at least one information processing terminal, a display request for a gift object, based on an input to an input portion of the at least one information processing terminal by the respective viewing user; and causing the display of the particular object to be changed according to the gift object.

11. The video distribution method according to claim 9, further comprising receiving, from the at least one information processing terminal, a display request for the particular object as a gift object for the video; and causing the particular object to be displayed in the video according to the display request.

12. A video distribution method for distributing video data including an animation of a virtual character object generated based on movement of a distribution user, the video distribution method comprising:

storing, in a memory, an activity of a plurality of viewing users and/or an activity of the distribution user during distribution of the video data;

generating the video data including (i) the virtual character object and (ii) a particular object that irreversibly changes a display, a plurality of times, from an initial form to a final form;

transmitting the video data to a plurality of information processing terminals in each of which an application for viewing a video based on the video data is implemented, and each of which is a device used by a respective viewing user; and causing the display of the particular object displayed in the video to be changed according to the activity, wherein the activity includes at least one of a request to display a gift object by one of the viewing users, the number of viewing users viewing the video, the viewing time of the viewing users viewing the video, and a distribution status of the video and the same particular object is displayed before and after the display is caused to be changed.

13. The video distribution method according to claim 12, wherein when the particular object reaches the final form, the display of the particular object is displayed in the video as including a deliverable, the deliverable is associated with the respective viewing user of the video, and the deliverable is stored in the memory.

14. The video distribution method according to claim 12, wherein when the particular object reaches the final form, a new particular object of the initial form associated with the particular object is generated.

15. The video distribution method according to claim 14, further comprising associating the new particular object with the respective viewing user;

receiving, from the at least one information processing terminal used by the respective viewing user, a display request for the new particular object with respect to a video different from the video in which the new particular object was generated; and causing the new particular object to be displayed in the different video based on the display request.

16. A video distribution method for distributing video data including an animation of a virtual character object generated based on movement of a distribution user, the video distribution method comprising:

storing, in a memory, an activity of a plurality of viewing users and/or an activity of the distribution user during distribution of the video data;

generating the video data including (i) the virtual character object and (ii) first and second particular objects each of which changes a display a plurality of times;

transmitting the video data to a plurality of information processing terminals in each of which an application for viewing a video based on the video data is implemented, and each of which is a device used by a respective viewing user;

receiving, from at least one of the information processing terminals, information regarding the activity;

causing the display displayed in the video to be changed according to the activity, wherein the activity includes at least one of a request to display a gift object by one of the viewing users, the number of viewing users viewing the video, and the viewing time of the viewing users viewing the video, and the same first and second particular objects are displayed before and after the display is caused to be changed; and generating a combined particular object based on the first and second particular objects and causing the combined particular object to be displayed in the video.

* * * * *